US012343302B2

(12) United States Patent
Marton

(10) Patent No.: US 12,343,302 B2
(45) Date of Patent: Jul. 1, 2025

(54) COMBINATION APPLICATOR AND ADAPTER FOR PERCUSSIVE MASSAGE DEVICE

(71) Applicant: Hyperice IP SubCo, LLC, Irvine, CA (US)

(72) Inventor: Robert Marton, Yorba Linda, CA (US)

(73) Assignee: HYPERICE IP SUBCO, LLC, Irvine, CA (US)

( * ) Notice: Subject to any disclaimer, the term of this patent is extended or adjusted under 35 U.S.C. 154(b) by 833 days.

(21) Appl. No.: 17/402,201

(22) Filed: Aug. 13, 2021

(65) Prior Publication Data

US 2023/0048861 A1 Feb. 16, 2023

(51) Int. Cl.
*A61H 23/00* (2006.01)

(52) U.S. Cl.
CPC ... *A61H 23/006* (2013.01); *A61H 2201/0153* (2013.01)

(58) Field of Classification Search
CPC ............ A61H 1/008; A61H 2201/0153; A61H 2201/1685; A61H 23/0254; A61H 23/02; A61H 2023/0209–0218; A61H 23/04; A61H 23/06; A61H 2201/0107; A61H 23/00–006
See application file for complete search history.

(56) References Cited

U.S. PATENT DOCUMENTS 784,024 A 3/1905 Barrett et al.
799,881 A 9/1905 Wells
863,525 A 12/1907 Gardy
873,123 A 12/1907 Gardy
1,269,803 A 6/1918 Elmen et al.
1,339,179 A 5/1920 Elmen
1,594,636 A 8/1926 Smith
1,612,981 A 1/1927 Mraula
1,657,765 A 1/1928 Pasque
1,784,301 A 12/1930 Mekler
1,978,223 A 10/1934 Parker
2,078,025 A 4/1937 Samuels
2,550,775 A 5/1951 Clark
(Continued)

FOREIGN PATENT DOCUMENTS

CA 188544 A 2/1919
CA 188545 A 2/1919
(Continued)

OTHER PUBLICATIONS

CN 112451345 A Machine translation (Year: 2021).*
(Continued)

*Primary Examiner* — Timothy A Stanis
*Assistant Examiner* — Sara K Toich
(74) *Attorney, Agent, or Firm* — Goodwin Procter LLP

(57) ABSTRACT

A combination applicator and adapter (“applicator/adapter”) is removably attachable to a percussive massage device. The applicator has a plurality of fixed applicator heads that can be applied directly against the body of a subject being massaged to provide a first massage effect. A corresponding plurality of removable applicator heads can be positioned over and attached to the fixed applicator heads. The removable applicator heads are applied against the body of the subject being massaged to provide a second massage experience.

18 Claims, 10 Drawing Sheets

(56) References Cited

U.S. PATENT DOCUMENTS

| | | | |
|---|---|---|---|
| 3,007,504 | A | 11/1961 | Clark |
| 3,030,647 | A | 4/1962 | Peyron |
| D197,889 | S | 4/1964 | Hass |
| 3,494,353 | A | 2/1970 | Marich |
| 3,626,934 | A | 12/1971 | Andis |
| 3,696,693 | A | 10/1972 | Bosten et al. |
| 3,699,952 | A | 10/1972 | Waters et al. |
| 3,705,578 | A | 12/1972 | Cutler et al. |
| 3,710,785 | A | 1/1973 | Hilger |
| 3,837,335 | A | 9/1974 | Teranishi |
| 3,841,321 | A | 10/1974 | Albach et al. |
| 3,845,758 | A | 11/1974 | Anderson |
| 3,920,291 | A | 11/1975 | Wendel et al. |
| 3,968,789 | A | 7/1976 | Simoncini |
| 3,993,052 | A | 11/1976 | Miyahara |
| 4,079,733 | A | 3/1978 | Denton et al. |
| 4,088,128 | A | 5/1978 | Mabuchi |
| 4,149,530 | A | 4/1979 | Gow |
| 4,150,668 | A | 4/1979 | Johnston |
| 4,162,675 | A | 7/1979 | Kawada |
| 4,173,217 | A | 11/1979 | Johnston |
| RE30,500 | E | 2/1981 | Springer et al. |
| 4,412,535 | A | 11/1983 | Teren |
| 4,505,267 | A | 3/1985 | Inada |
| 4,513,737 | A | 4/1985 | Mabuchi |
| 4,523,580 | A | 6/1985 | Tureaud |
| 4,549,535 | A | 10/1985 | Wing |
| 4,566,442 | A | 1/1986 | Mabuchi et al. |
| 4,691,693 | A | 9/1987 | Sato |
| 4,698,869 | A | 10/1987 | Mierau et al. |
| 4,709,201 | A | 11/1987 | Schaefer et al. |
| 4,726,430 | A | 2/1988 | Hendrikx et al. |
| 4,730,605 | A | 3/1988 | Noble et al. |
| 4,751,452 | A | 6/1988 | Kilmer et al. |
| 4,790,296 | A | 12/1988 | Segal |
| 4,827,914 | A | 5/1989 | Kamazawa |
| 4,841,955 | A * | 6/1989 | Evans ................ A61H 23/0218 601/108 |
| 4,858,600 | A | 8/1989 | Gross et al. |
| 4,880,713 | A | 11/1989 | Levine |
| 4,989,613 | A | 2/1991 | Finkenberg |
| 5,043,651 | A | 8/1991 | Tamura |
| 5,063,911 | A | 11/1991 | Teranishi |
| 5,065,743 | A | 11/1991 | Sutherland |
| D323,034 | S | 1/1992 | Reinstein |
| D323,606 | S | 2/1992 | Chang |
| 5,085,207 | A | 2/1992 | Fiore |
| 5,134,777 | A | 8/1992 | Meyer et al. |
| 5,140,979 | A | 8/1992 | Nakagawa |
| D329,291 | S | 9/1992 | Wollman |
| D329,292 | S | 9/1992 | Wollman |
| 5,159,922 | A | 11/1992 | Mabuchi et al. |
| D331,467 | S | 12/1992 | Wollman |
| D335,073 | S | 4/1993 | Anthony et al. |
| 5,215,051 | A | 6/1993 | Smith |
| 5,215,078 | A | 6/1993 | Fulop |
| 5,305,738 | A | 4/1994 | Shimizu |
| 5,311,860 | A | 5/1994 | Doria |
| 5,364,223 | A | 11/1994 | Bissex |
| 5,415,621 | A | 5/1995 | Campbell |
| 5,417,644 | A | 5/1995 | Lee |
| 5,447,491 | A | 9/1995 | Bellandi et al. |
| 5,469,860 | A | 11/1995 | De Santis |
| 5,489,280 | A | 2/1996 | Russell |
| D367,712 | S | 3/1996 | Young |
| D373,640 | S | 9/1996 | Young |
| 5,569,168 | A | 10/1996 | Hartwig |
| 5,573,500 | A | 11/1996 | Katsunuma et al. |
| D377,100 | S | 12/1996 | Gladieux, Jr. |
| 5,602,432 | A | 2/1997 | Mizutani |
| D378,338 | S | 3/1997 | Acciville et al. |
| 5,632,720 | A | 5/1997 | Kleitz |
| D379,580 | S | 6/1997 | Amundsen |
| 5,656,017 | A | 8/1997 | Keller et al. |
| 5,656,018 | A | 8/1997 | Tseng |
| D388,175 | S | 12/1997 | Lie |
| 5,725,483 | A | 3/1998 | Podolsky |
| 5,733,029 | A | 3/1998 | Monroe |
| 5,769,657 | A | 6/1998 | Kondo et al. |
| 5,797,462 | A | 8/1998 | Rahm |
| 5,803,916 | A | 9/1998 | Kuznets et al. |
| D403,220 | S | 12/1998 | Kimata et al. |
| 5,843,006 | A | 12/1998 | Phillips et al. |
| D407,498 | S | 3/1999 | Cooper |
| D408,241 | S | 4/1999 | Jansson |
| 5,925,002 | A | 7/1999 | Wollman |
| 5,935,089 | A | 8/1999 | Shimizu |
| 5,951,501 | A | 9/1999 | Griner |
| 6,051,957 | A | 4/2000 | Klein |
| 6,102,875 | A | 8/2000 | Jones |
| D430,938 | S | 9/2000 | Lee |
| 6,123,657 | A | 9/2000 | Ishikawa et al. |
| 6,165,145 | A | 12/2000 | Noble |
| 6,170,108 | B1 | 1/2001 | Knight |
| D437,713 | S | 2/2001 | Young |
| D438,309 | S | 2/2001 | Young |
| 6,228,042 | B1 | 5/2001 | Dungan |
| 6,231,497 | B1 | 5/2001 | Souder |
| D448,852 | S | 10/2001 | Engelen |
| 6,357,125 | B1 | 3/2002 | Feldmann et al. |
| D455,837 | S | 4/2002 | Kim |
| 6,375,609 | B1 | 4/2002 | Hastings et al. |
| 6,401,289 | B1 | 6/2002 | Herbert |
| 6,402,710 | B1 | 6/2002 | Hsu |
| D460,675 | S | 7/2002 | Morgan |
| 6,432,072 | B1 | 8/2002 | Harris et al. |
| 6,440,091 | B1 | 8/2002 | Hirosawa |
| 6,461,377 | B1 | 10/2002 | An |
| 6,478,755 | B2 | 11/2002 | Young |
| D467,148 | S | 12/2002 | Flickinger |
| 6,494,849 | B2 | 12/2002 | Kuo |
| 6,503,211 | B2 | 1/2003 | Frye |
| 6,537,236 | B2 | 3/2003 | Tucek et al. |
| D474,089 | S | 5/2003 | Huang |
| 6,577,287 | B2 | 6/2003 | Havel |
| 6,581,596 | B1 | 6/2003 | Truitt et al. |
| D476,746 | S | 7/2003 | Harris et al. |
| 6,585,667 | B1 | 7/2003 | Muller |
| 6,602,211 | B2 | 8/2003 | Tucek |
| 6,616,621 | B1 | 9/2003 | Kohr |
| 6,656,140 | B2 | 12/2003 | Oguma et al. |
| 6,663,657 | B1 | 12/2003 | Miller |
| 6,682,496 | B1 | 1/2004 | Pivaroff |
| D487,219 | S | 3/2004 | Chudy et al. |
| 6,758,826 | B2 | 7/2004 | Luettgen et al. |
| 6,805,700 | B2 | 10/2004 | Miller |
| D498,128 | S | 11/2004 | Sterling |
| 6,832,991 | B1 | 12/2004 | Inada et al. |
| 6,866,776 | B2 | 3/2005 | Leason et al. |
| 6,979,300 | B1 | 12/2005 | Julian et al. |
| 6,994,679 | B1 | 2/2006 | Lee |
| 7,033,329 | B2 | 4/2006 | Liao |
| 7,041,072 | B2 | 5/2006 | Calvert |
| 7,083,581 | B2 | 8/2006 | Tsai |
| 7,125,390 | B2 | 10/2006 | Ferber et al. |
| 7,128,722 | B2 | 10/2006 | Lev et al. |
| D531,733 | S | 11/2006 | Burout, III et al. |
| 7,144,417 | B2 | 12/2006 | Colloca et al. |
| 7,169,169 | B2 | 1/2007 | Tucek et al. |
| D536,591 | S | 2/2007 | Ghode et al. |
| 7,211,057 | B2 | 5/2007 | Gleason et al. |
| D544,102 | S | 6/2007 | Pivaroff |
| 7,229,424 | B2 | 6/2007 | Jones et al. |
| 7,238,162 | B2 | 7/2007 | Dehli |
| D548,354 | S | 8/2007 | Lai |
| 7,264,598 | B2 | 9/2007 | Shin |
| 7,270,641 | B2 | 9/2007 | Glucksman et al. |
| D553,252 | S | 10/2007 | Masuda |
| 7,282,036 | B2 | 10/2007 | Masuda |
| 7,282,037 | B2 | 10/2007 | Cho |
| D555,255 | S | 11/2007 | Masuda |
| 7,306,569 | B2 | 12/2007 | LaJoie et al. |
| 7,322,946 | B2 | 1/2008 | Lev et al. |
| 7,335,170 | B2 | 2/2008 | Milne et al. |

(56) References Cited

U.S. PATENT DOCUMENTS

| | | | |
|---|---|---|---|
| 7,354,408 | B2 | 4/2008 | Muchisky |
| D581,542 | S | 11/2008 | Ferber et al. |
| D581,543 | S | 11/2008 | Ferber et al. |
| D582,049 | S | 12/2008 | Ferber et al. |
| 7,470,242 | B2 | 12/2008 | Ferber et al. |
| 7,503,923 | B2 | 3/2009 | Miller |
| 7,507,198 | B2 | 3/2009 | Ardizzone et al. |
| 7,517,327 | B1 | 4/2009 | Knight |
| 7,597,669 | B2 | 10/2009 | Huang |
| D606,192 | S | 12/2009 | Summerer et al. |
| 7,629,766 | B2 | 12/2009 | Sadow |
| 7,634,314 | B2 | 12/2009 | Applebaum et al. |
| 7,658,012 | B2 | 2/2010 | James et al. |
| D613,416 | S | 4/2010 | Schupman |
| D625,164 | S | 10/2010 | Aglassinger |
| D627,897 | S | 11/2010 | Yde et al. |
| D627,898 | S | 11/2010 | Aulwes et al. |
| 7,927,259 | B1 | 4/2011 | Rix |
| 7,927,294 | B2 | 4/2011 | Kamimura et al. |
| 7,976,485 | B2 | 7/2011 | Huang |
| D649,657 | S | 11/2011 | Petersen et al. |
| 8,052,625 | B2 | 11/2011 | Tsai et al. |
| 8,083,699 | B2 | 12/2011 | Colloca et al. |
| 8,092,407 | B2 | 1/2012 | Tsukada et al. |
| D658,759 | S | 5/2012 | Marescaux et al. |
| 8,192,379 | B2 | 6/2012 | Huang |
| D665,915 | S | 8/2012 | Ma |
| 8,282,583 | B2 | 10/2012 | Tsai |
| 8,317,733 | B2 | 11/2012 | Chen et al. |
| 8,342,187 | B2 | 1/2013 | Kalman et al. |
| 8,435,194 | B2 | 5/2013 | Dverin et al. |
| 8,475,362 | B2 | 7/2013 | Sohn et al. |
| 8,632,525 | B2 | 1/2014 | Kerr et al. |
| 8,673,487 | B2 | 3/2014 | Churchill |
| D703,337 | S | 4/2014 | Fuhr et al. |
| D706,433 | S | 6/2014 | Fuhr et al. |
| D708,742 | S | 7/2014 | Dallemagne et al. |
| 8,826,547 | B2 | 9/2014 | Oberheim |
| 8,841,871 | B2 | 9/2014 | Yang et al. |
| D719,273 | S | 12/2014 | Chen |
| 8,951,216 | B2 | 2/2015 | Yoo et al. |
| D725,790 | S | 3/2015 | Givord |
| D725,978 | S | 4/2015 | Uematsu et al. |
| 9,017,355 | B2 | 4/2015 | Smith et al. |
| D734,863 | S | 7/2015 | Hennessey |
| D735,348 | S | 7/2015 | Hennessey |
| 9,107,690 | B2 | 8/2015 | Bales, Jr. et al. |
| D738,516 | S | 9/2015 | Karim |
| 9,272,141 | B2 | 3/2016 | Nichols |
| D752,936 | S | 4/2016 | King et al. |
| D757,953 | S | 5/2016 | Philips |
| 9,333,371 | B2 | 5/2016 | Bean et al. |
| D759,237 | S | 6/2016 | Heath et al. |
| D759,238 | S | 6/2016 | Heath et al. |
| D759,831 | S | 6/2016 | Levi et al. |
| 9,364,626 | B2 | 6/2016 | Carter et al. |
| D763,442 | S | 8/2016 | Price et al. |
| D778,439 | S | 2/2017 | Hakansson et al. |
| 9,756,402 | B2 | 9/2017 | Stampfl et al. |
| D810,280 | S | 2/2018 | Tharp et al. |
| 9,889,066 | B2 | 2/2018 | Danby et al. |
| D819,221 | S | 5/2018 | Lei |
| D823,478 | S | 7/2018 | Park |
| D825,073 | S | 8/2018 | Lenke |
| D827,842 | S | 9/2018 | Bainton et al. |
| D827,843 | S | 9/2018 | Bainton et al. |
| 10,162,106 | B1 | 12/2018 | Grillo et al. |
| D837,395 | S | 1/2019 | Gan |
| D838,378 | S | 1/2019 | Cao |
| D840,032 | S | 2/2019 | Clifford et al. |
| D840,547 | S | 2/2019 | Harle et al. |
| 10,201,470 | B2 | 2/2019 | Griner |
| D842,491 | S | 3/2019 | Fleming et al. |
| D843,002 | S | 3/2019 | Yarborough et al. |
| D843,656 | S | 3/2019 | Zhang et al. |
| D844,896 | S | 4/2019 | Levi et al. |
| D845,499 | S | 4/2019 | Wersland et al. |
| D847,362 | S | 4/2019 | Tang |
| D847,364 | S | 4/2019 | Lee et al. |
| 10,245,033 | B2 | 4/2019 | Overmyer et al. |
| D847,990 | S | 5/2019 | Kimball |
| D848,089 | S | 5/2019 | Cunniff |
| D849,260 | S | 5/2019 | Wersland et al. |
| D850,640 | S | 6/2019 | Wersland et al. |
| 10,314,762 | B1 | 6/2019 | Marton et al. |
| 10,357,425 | B2 | 7/2019 | Wersland et al. |
| D855,822 | S | 8/2019 | Marton et al. |
| D865,192 | S | 10/2019 | Nazarian |
| 10,456,325 | B2 | 10/2019 | Fan |
| 10,470,970 | B2 * | 11/2019 | Nazarian ............ A61H 15/0085 |
| D869,928 | S | 12/2019 | Hsiao |
| 10,492,984 | B2 | 12/2019 | Marton et al. |
| 10,561,574 | B1 | 2/2020 | Marton et al. |
| D879,290 | S | 3/2020 | Harman et al. |
| 10,617,588 | B2 | 4/2020 | Wersland et al. |
| D890,353 | S | 7/2020 | Nazarian |
| D890,942 | S | 7/2020 | Wersland et al. |
| D890,943 | S | 7/2020 | Wersland et al. |
| 10,702,448 | B2 | 7/2020 | Wersland et al. |
| 10,743,650 | B2 | 8/2020 | Katano et al. |
| D896,393 | S | 9/2020 | Wersland et al. |
| 10,774,860 | B2 | 9/2020 | Wersland et al. |
| D903,140 | S | 11/2020 | Andrejs |
| 10,847,984 | B2 | 11/2020 | Solana et al. |
| 10,857,064 | B2 | 12/2020 | Wersland et al. |
| D907,792 | S | 1/2021 | Marton et al. |
| D908,235 | S | 1/2021 | Marton et al. |
| 10,888,492 | B2 | 1/2021 | Marton et al. |
| D910,870 | S | 2/2021 | Marton et al. |
| 10,905,627 | B2 | 2/2021 | Marton et al. |
| 10,912,708 | B2 | 2/2021 | Marton et al. |
| D918,404 | S | 5/2021 | Wersland et al. |
| 10,993,874 | B1 | 5/2021 | Marton et al. |
| D928,334 | S | 8/2021 | Chou |
| D932,036 | S | 9/2021 | Nazarian |
| 11,166,863 | B2 | 11/2021 | Wersland et al. |
| D946,166 | S | 3/2022 | Li |
| D949,365 | S | 4/2022 | Li |
| D949,416 | S | 4/2022 | Khubani et al. |
| D949,417 | S | 4/2022 | Khubani et al. |
| D949,418 | S | 4/2022 | Khubani et al. |
| D952,878 | S | 5/2022 | Lin |
| D970,743 | S | 11/2022 | Brailey |
| 2002/0058892 | A1 | 5/2002 | Young |
| 2002/0161315 | A1 | 10/2002 | Harris et al. |
| 2002/0177795 | A1 | 11/2002 | Frye |
| 2002/0188233 | A1 | 12/2002 | Denyes |
| 2003/0009116 | A1 * | 1/2003 | Luettgen ................ A61H 19/34 601/72 |
| 2003/0014079 | A1 | 1/2003 | Tucek |
| 2003/0028134 | A1 | 2/2003 | Lev et al. |
| 2003/0060741 | A1 | 3/2003 | Park |
| 2003/0114781 | A1 | 6/2003 | Beaty et al. |
| 2003/0130602 | A1 | 7/2003 | Chang |
| 2003/0144615 | A1 | 7/2003 | Lin |
| 2003/0195438 | A1 | 10/2003 | Petillo |
| 2003/0195443 | A1 | 10/2003 | Miller |
| 2003/0218045 | A1 | 11/2003 | Shkolnikov |
| 2004/0010268 | A1 | 1/2004 | Gabehart |
| 2004/0144553 | A1 | 7/2004 | Ashbaugh |
| 2004/0254507 | A1 | 12/2004 | Off |
| 2004/0260213 | A1 | 12/2004 | Szczepanski |
| 2005/0015030 | A1 | 1/2005 | Bousfield et al. |
| 2005/0075591 | A1 | 4/2005 | Hafemann |
| 2005/0096571 | A1 | 5/2005 | Miki |
| 2005/0096682 | A1 | 5/2005 | Daffer |
| 2005/0113870 | A1 | 5/2005 | Miller |
| 2005/0131461 | A1 | 6/2005 | Tucek et al. |
| 2005/0192519 | A1 | 9/2005 | Crunick |
| 2005/0203448 | A1 | 9/2005 | Harris et al. |
| 2006/0025710 | A1 | 2/2006 | Schulz et al. |
| 2006/0058714 | A1 | 3/2006 | Rhoades |
| 2006/0074360 | A1 | 4/2006 | Yu |
| 2006/0116614 | A1 | 6/2006 | Jones et al. |

(56) References Cited

U.S. PATENT DOCUMENTS

| | | | |
|---|---|---|---|
| 2006/0178040 | A1 | 8/2006 | Kurosawa |
| 2006/0178715 | A1 | 8/2006 | Ahn et al. |
| 2006/0211961 | A1 | 9/2006 | Meyer et al. |
| 2006/0293711 | A1 | 12/2006 | Keller et al. |
| 2007/0144310 | A1 | 6/2007 | Pozgay et al. |
| 2007/0150004 | A1 | 6/2007 | Colloca et al. |
| 2007/0154783 | A1 | 7/2007 | Jeon |
| 2007/0179414 | A1 | 8/2007 | Imboden et al. |
| 2007/0257638 | A1 | 11/2007 | Amend et al. |
| 2008/0196553 | A1 | 8/2008 | Hoffmann et al. |
| 2008/0214968 | A1 | 9/2008 | Milne et al. |
| 2008/0234611 | A1 | 9/2008 | Sakai et al. |
| 2008/0243039 | A1 | 10/2008 | Rhoades |
| 2008/0262397 | A1 | 10/2008 | Habatjou |
| 2008/0262399 | A1 | 10/2008 | Kovelman et al. |
| 2008/0275371 | A1 | 11/2008 | Hoffmann |
| 2008/0306417 | A1 | 12/2008 | Imboden et al. |
| 2009/0000039 | A1 | 1/2009 | St. John et al. |
| 2009/0005812 | A1 | 1/2009 | Fuhr |
| 2009/0182249 | A1 | 7/2009 | Sakai et al. |
| 2009/0270915 | A1 | 10/2009 | Tsai et al. |
| 2009/0286145 | A1 | 11/2009 | Wan et al. |
| 2009/0306577 | A1 | 12/2009 | Akridge et al. |
| 2010/0116517 | A1 | 5/2010 | Katzenberger et al. |
| 2010/0145242 | A1 | 6/2010 | Tsai |
| 2010/0160841 | A1 | 6/2010 | Wu |
| 2010/0164434 | A1 | 7/2010 | Cacioppo et al. |
| 2010/0185127 | A1 | 7/2010 | Nilsson et al. |
| 2010/0228168 | A1 | 9/2010 | Xu et al. |
| 2010/0252294 | A1 | 10/2010 | Kondo et al. |
| 2010/0274162 | A1 | 10/2010 | Evans |
| 2010/0331745 | A1 | 12/2010 | Yao |
| 2011/0017742 | A1 | 1/2011 | Sausen et al. |
| 2011/0087141 | A1 | 4/2011 | Wagy et al. |
| 2011/0106067 | A1 | 5/2011 | Geva et al. |
| 2011/0169481 | A1 | 7/2011 | Nguyen et al. |
| 2012/0038483 | A1 | 2/2012 | Du et al. |
| 2012/0120573 | A1 | 5/2012 | Bentley |
| 2012/0197357 | A1 | 8/2012 | Dewey et al. |
| 2012/0215141 | A1 | 8/2012 | Peddicord |
| 2012/0253245 | A1 | 10/2012 | Stanbridge |
| 2012/0259255 | A1 | 10/2012 | Tomlinson et al. |
| 2012/0281392 | A1 | 11/2012 | Workman et al. |
| 2012/0296244 | A1 | 11/2012 | Ceoldo et al. |
| 2013/0006040 | A1 | 1/2013 | Lee |
| 2013/0030506 | A1 | 1/2013 | Bartolone et al. |
| 2013/0076271 | A1 | 3/2013 | Suda et al. |
| 2013/0102937 | A1 | 4/2013 | Ehrenreich et al. |
| 2013/0112451 | A1 | 5/2013 | Kondo et al. |
| 2013/0138023 | A1 | 5/2013 | Lerro |
| 2013/0261516 | A1 | 10/2013 | Cilea et al. |
| 2013/0281897 | A1 | 10/2013 | Hoffmann et al. |
| 2013/0289457 | A1 | 10/2013 | Young et al. |
| 2013/0294019 | A1 | 11/2013 | LaSota et al. |
| 2014/0014384 | A1 | 1/2014 | Horie et al. |
| 2014/0031866 | A1 | 1/2014 | Fuhr et al. |
| 2014/0094724 | A1 | 4/2014 | Freeman |
| 2014/0159507 | A1 | 6/2014 | Johnson et al. |
| 2014/0221887 | A1 | 8/2014 | Wu |
| 2014/0288473 | A1 | 9/2014 | Matsushita |
| 2015/0005682 | A1 | 1/2015 | Danby et al. |
| 2015/0107383 | A1 | 4/2015 | Duesselberg et al. |
| 2015/0119771 | A1 | 4/2015 | Roberts |
| 2015/0148592 | A1 | 5/2015 | Kanbar et al. |
| 2015/0182415 | A1 | 7/2015 | Olkowski et al. |
| 2015/0351999 | A1 | 12/2015 | Brouse |
| 2015/0366746 | A1 | 12/2015 | Ashby |
| 2016/0151238 | A1 | 6/2016 | Crunick et al. |
| 2016/0256348 | A1 | 9/2016 | Giraud et al. |
| 2016/0271009 | A1 | 9/2016 | Giraud et al. |
| 2016/0278436 | A1 | 9/2016 | Verleur et al. |
| 2016/0354277 | A1 | 12/2016 | Fima |
| 2016/0367425 | A1 | 12/2016 | Wersland |
| 2017/0012257 | A1 | 1/2017 | Wackwitz et al. |
| 2017/0027798 | A1 | 2/2017 | Wersland |
| 2017/0028160 | A1 | 2/2017 | Oliver |
| 2017/0087379 | A1 | 3/2017 | Sedic |
| 2017/0304145 | A1 | 10/2017 | Pepe |
| 2017/0333280 | A1 | 11/2017 | Black |
| 2018/0008512 | A1 | 1/2018 | Goldstein |
| 2018/0154141 | A1 | 6/2018 | Ahn |
| 2018/0168913 | A1 | 6/2018 | Sedic |
| 2018/0200141 | A1 | 7/2018 | Wersland et al. |
| 2018/0263845 | A1 | 9/2018 | Wersland et al. |
| 2019/0015294 | A1 | 1/2019 | Nazarian et al. |
| 2019/0091096 | A1 | 3/2019 | Patel |
| 2019/0125972 | A1 | 5/2019 | Srinivasan et al. |
| 2019/0175434 | A1 | 6/2019 | Zhang |
| 2019/0198828 | A1 | 6/2019 | Zanon et al. |
| 2019/0209424 | A1 | 7/2019 | Wersland et al. |
| 2019/0232403 | A1* | 8/2019 | Candelaria ............. A61H 23/02 |
| 2019/0254921 | A1 | 8/2019 | Marton et al. |
| 2019/0254922 | A1 | 8/2019 | Marton et al. |
| 2019/0350793 | A1 | 11/2019 | Wersland et al. |
| 2020/0069510 | A1 | 3/2020 | Wersland et al. |
| 2020/0085675 | A1 | 3/2020 | Lee et al. |
| 2020/0093945 | A1 | 3/2020 | Jeong |
| 2020/0128935 | A1 | 4/2020 | Turner |
| 2020/0222263 | A1 | 7/2020 | Wersland et al. |
| 2020/0261306 | A1 | 8/2020 | Pepe |
| 2020/0261307 | A1 | 8/2020 | Wersland et al. |
| 2020/0261310 | A1 | 8/2020 | Wersland et al. |
| 2020/0274162 | A1 | 8/2020 | Galceran Mestres et al. |
| 2020/0276079 | A1 | 9/2020 | Cheng |
| 2020/0289365 | A1 | 9/2020 | Wersland et al. |
| 2020/0329858 | A1 | 10/2020 | Katano et al. |
| 2020/0330321 | A1 | 10/2020 | Wersland et al. |
| 2020/0352820 | A1 | 11/2020 | Nazarian et al. |
| 2020/0352821 | A1 | 11/2020 | Wersland et al. |
| 2020/0405574 | A1 | 12/2020 | Wersland et al. |
| 2021/0022955 | A1 | 1/2021 | Wersland et al. |

FOREIGN PATENT DOCUMENTS

| | | | |
|---|---|---|---|
| CA | 188553 | A | 2/1919 |
| CA | 1042745 | A | 11/1978 |
| CA | 2440783 | A1 | 3/2004 |
| CN | 2049126 | U | 12/1989 |
| CN | 2144503 | Y | 10/1993 |
| CN | 2207816 | Y | 9/1995 |
| CN | 1149446 | A | 5/1997 |
| CN | 1228299 | A | 9/1999 |
| CN | 2412567 | Y | 1/2001 |
| CN | 2540948 | Y | 3/2003 |
| CN | 2694966 | Y | 4/2005 |
| CN | 201478387 | U | 5/2010 |
| CN | 101801326 | A | 8/2010 |
| CN | 202459196 | U | 10/2012 |
| CN | 202478137 | U | 10/2012 |
| CN | 202536467 | U | 11/2012 |
| CN | 101958410 | B | 1/2013 |
| CN | 103248096 | A | 8/2013 |
| CN | 203195947 | U | 9/2013 |
| CN | 103398298 | A | 11/2013 |
| CN | 203395603 | U | 1/2014 |
| CN | 103655142 | A | 3/2014 |
| CN | 204208018 | U | 3/2015 |
| CN | 204246459 | U | 4/2015 |
| CN | 204814773 | U | 12/2015 |
| CN | 205017429 | U | 2/2016 |
| CN | 205251993 | U | 5/2016 |
| CN | 205268525 | U | 6/2016 |
| CN | 205458346 | U | 8/2016 |
| CN | 106491005 | A | 3/2017 |
| CN | 206183628 | U | 5/2017 |
| CN | 106806103 | A | 6/2017 |
| CN | 206333979 | U | 7/2017 |
| CN | 206381369 | U | 8/2017 |
| CN | 206381373 | U | 8/2017 |
| CN | 206381389 | U | 8/2017 |
| CN | 107157741 | A | 9/2017 |
| CN | 206675699 | U | 11/2017 |
| CN | 304486625 | | 2/2018 |
| CN | 208130157 | U | 11/2018 |

(56) References Cited

FOREIGN PATENT DOCUMENTS

| | | | | |
|---|---|---|---|---|
| CN | 210301676 U | | 4/2020 | |
| CN | 210872953 U | | 6/2020 | |
| CN | 111759711 A | | 10/2020 | |
| CN | 112451345 A | * | 3/2021 | ........... A61H 23/006 |
| DE | 102012212256 A1 | | 1/2014 | |
| DE | 202013012621 U1 | | 12/2017 | |
| EM | 004377638-0002 | | 10/2017 | |
| EP | 0040053 A1 | | 11/1981 | |
| EP | 0158870 A1 | | 10/1985 | |
| EP | 0666071 A1 | | 8/1995 | |
| EP | 0572506 B1 | | 1/1997 | |
| EP | 1728494 A1 | | 12/2006 | |
| EP | 1620233 B1 | | 2/2007 | |
| EP | 2510891 B1 | | 6/2016 | |
| EP | 3062383 A2 | | 8/2016 | |
| EP | 3235484 A1 | | 10/2017 | |
| EP | 3320888 A1 | | 5/2018 | |
| EP | 3435381 A1 | | 1/2019 | |
| FI | 903376 A | | 12/1991 | |
| GB | 191209026 A | | 3/1913 | |
| GB | 191509508 A | | 6/1916 | |
| GB | 188946 A | | 11/1922 | |
| GB | 213117 A | | 3/1924 | |
| GB | 1293876 A | | 10/1972 | |
| JP | S54110058 A | | 8/1979 | |
| JP | S6389158 A | | 4/1988 | |
| JP | H04250161 A | | 9/1992 | |
| JP | H053903 A | | 1/1993 | |
| JP | H0751393 A | | 2/1995 | |
| JP | H0733329 B2 | | 6/1995 | |
| JP | H07153440 A | | 6/1995 | |
| JP | H0866448 A | | 3/1996 | |
| JP | H08131500 A | | 5/1996 | |
| JP | H0992246 A | | 4/1997 | |
| JP | 2781408 B2 | | 7/1998 | |
| JP | 2999872 B2 | | 1/2000 | |
| JP | 2002218780 A | | 8/2002 | |
| JP | 2003230613 A | | 8/2003 | |
| JP | 2004024523 A | | 1/2004 | |
| JP | 2004141568 A | | 5/2004 | |
| JP | 3813828 B2 | | 8/2006 | |
| JP | 2007044319 A | | 2/2007 | |
| JP | 2009291451 A | | 12/2009 | |
| JP | 2010075288 A | | 4/2010 | |
| JP | 5859905 B2 | | 2/2016 | |
| JP | 1683409 S | | 4/2021 | |
| KR | 20000043488 A | | 7/2000 | |
| KR | 20030008342 A | | 1/2003 | |
| KR | 200311328 Y1 | | 5/2003 | |
| KR | 20060074625 A | | 7/2006 | |
| KR | 200422971 Y1 | | 8/2006 | |
| KR | 100785097 B1 | | 12/2007 | |
| KR | 20090128807 A | | 12/2009 | |
| KR | 2010-0023508 A | | 3/2010 | |
| KR | 101007827 B1 | | 1/2011 | |
| KR | 101162978 B1 | | 7/2012 | |
| KR | 101315314 B1 | | 10/2013 | |
| KR | 101504885 B1 | | 3/2015 | |
| KR | 101649522 B1 | | 8/2016 | |
| KR | 3010427980000 | | 1/2020 | |
| KR | 102078829 B1 | | 2/2020 | |
| RU | 2053754 C1 | | 2/1996 | |
| RU | 2464005 C1 | | 10/2012 | |
| TW | M272528 U | | 8/2005 | |
| TW | M343481 U | | 11/2008 | |
| TW | M379178 U | | 4/2010 | |
| TW | M402573 U | | 4/2011 | |
| TW | M433702 U | | 7/2012 | |
| TW | M493379 U | | 1/2015 | |
| TW | M543692 U | | 6/2017 | |
| TW | D202371 S | | 1/2020 | |
| TW | 202017550 A | | 5/2020 | |
| TW | M599159 U | | 8/2020 | |
| WO | WO-9214435 A1 | | 9/1992 | |
| WO | WO-9625908 A1 | | 8/1996 | |
| WO | WO-03006102 A2 | | 1/2003 | |
| WO | WO-2008/113139 A1 | | 9/2008 | |
| WO | WO-2009/014727 A1 | | 1/2009 | |
| WO | WO-2011122812 A2 | | 10/2011 | |
| WO | WO-2011/159906 A2 | | 12/2011 | |
| WO | WO-2012/134469 A1 | | 10/2012 | |
| WO | WO-2012/177028 A2 | | 12/2012 | |
| WO | WO-2013/141359 A1 | | 9/2013 | |
| WO | WO-2014/038359 A1 | | 3/2014 | |
| WO | WO-2014118596 A1 | | 8/2014 | |
| WO | WO-2015038005 A2 | | 3/2015 | |
| WO | WO-2017/123841 A2 | | 7/2017 | |
| WO | WO-2017/184505 A2 | | 10/2017 | |
| WO | WO-2020/101725 A1 | | 5/2020 | |
| WO | WO-2020/227225 A1 | | 11/2020 | |
| WO | WO-2020/227230 A1 | | 11/2020 | |
| WO | WO-2020/227569 A1 | | 11/2020 | |

OTHER PUBLICATIONS

Amazon, "Theragun G3PRO Percussive Therapy Device", (Feb. 13, 2019)https://www.amazon.com/G3PRO-Percussive-Professional-Stimulator-Performance/dp/B07MJ2MCT3, 13 pages.

Campbell, D., "Jolt Therapy Tool," https://www.youtube.com/watch?v=-1nLjD-xRgl, Jul. 28, 2017, 3 pages.

Cavity—definition in the Cambridge English Dictionary; https://dictionary.cambridge.org/us/dictionary/english/cavity; retrieved Sep. 23, 2020 (9 pages).

Centech 4 in 1 Portable Power Pack Owner's Manual & Safety Instructions, 2014, 12 pages.

Christiana, A., "Porter-Cable PCL212ICC-2 12V Compact Lithium Two Tool Kit," Dec. 5, 2014, 5 pages.

Curriculum Vitae of Philip J. O'Keefe, PE (10 pages).

Declaration of Philip O'Keefe, P.E., in Support of Petition or Post-Grant Review dated Sep. 30, 2020 (136 pages).

DePuy Synthes Power Tools, "Battery Power Line II, User's Manual," for Battery-driven power tool system for orthopedics and traumatology, Dec. 2012, 83 pages.

DIY Jigsaw "Drill" Massager—Percussion Massager, Feb. 9, 2018, 19 pages.

http://web.archive.org/web/20100418041422/http://www.instructables.com:80/id/Jigsaw-Massager/ (Year: 2010), 6 pages.

Hyperlce PGR (Final Filing Draft); *Shenzhen Shufang Innovation Technology Co., Ltd.; Nenz Electric Technology (Dongguan) Co., Ltd.; Shenzhen Xinde Technology Co., Ltd.; Performance Health Systems, LLC; Yongkang Aijiu Industrial & Trade Co., Ltd.* (Petitioner) v. *Hyper Ice, Inc.* (Patent Owner) Petition for Post Grant Review U.S. Pat. No. 10,561,574 dated Sep. 30, 2020 (119 pages—uploaded in two parts p. 1-59 and p. 60-119).

Inner—definition in the Cambridge English Dictionary; https://dictionary.cambridge.org/us/dictionary/english/inner; retrieved Aug. 20, 2020 (2 pages).

International Preliminary Report on Patentability and Written Opinion of International Application No. PCT/US2021/057033 dated May 11, 2023, 9 pages.

International Preliminary Report on Patentability of corresponding International application PCT/US2018/053352, dated Aug. 27, 2020, 16 pages.

International Preliminary Report on Patentability of International Application No. PCT/US2021/041073 dated Jan. 10, 2023, 10 pages.

International Search Report and Written Opinion of PCT/US2019/013769 dated Aug. 9, 2019, 13 pages.

International Search Report and Written Opinion of PCT/US2021/057033 dated Feb. 16, 2022, 14 pages.

Knopp, B., "How to Change Jolt Attachments," https://www.youtube.com/watch?v=pl-vHxRtXUQ, Apr. 5, 2017, 6 pages.

Longitudinal—definition in the Cambridge English Dictionary; https://dictionary.cambridge.org/us/dictionary/english longitudinal; retrieved Sep. 22, 2020 (8 pages).

Microchip MCP73833/4 Stand-Along Linear Li-Ion / Li-Polymer Charge Management Controller; 2009 Microchip Technology Inc. (32 pages).

(56) References Cited

OTHER PUBLICATIONS

NutriKlick Deep Tissue Massage Gun, Date Unknown.
Outer—definition in the Cambridge English Dictionary; https://dictionary.cambridge.org/us/dictionary/english/outer; retrieved Sep. 22, 2020 (8 pages).
Perfomax 8 Volt Li-Ion Cordless Driver Owner's Manual, www.manualslib.com, Jul. 27, 2012, 19 pages.
Perimeter—definition in the Cambridge English Dictionary; https://dictionary.cambridge.org/us/dictionary/english/perimeter; retrieved Aug. 20, 2020 (1 page).
Practical Electronics for Inventors by Paul Scherz, 2000; (3 pages cover, copyright page and p. 200).
Rachel [family name unknown], "Jigsaw Massager," Aug. 28, 2007, 8 pages. Information available online from http://www.instructables.com/id/jigsaw-massager/.
Office Action for U.S. Appl. No. 16/107,587, mailed Dec. 26, 2018, 36 pages.
Synthes Battery Power Line, Jun. 2009, 6 pages.
Theragun Owners Manual G2PRO, 16 pages.
TIMTAM Power Massage 1.5, Aug. 7, 2020, 4 pages.
TOPiando Multifunctional Massage Gun, 19 pages, date unknown.
Within—definition in the Cambridge English Dictionary; https://dictionary.cambridge.org/us/dictionary/english/within; retrieved Aug. 20, 2020 (3 pages).
Feb. 27, 2019 Office Action for U.S. Appl. No. 16/201,542.
Yu-Chung, C., "Electrolux Power Drill," www.design-inspiration.net/inspiration/yu-chung-chang-electrolux-power-drill/, Aug. 20, 2017, 4 pages.
U.S. Appl. No. 18/466,702 Published as: 2024/0000656, Massage Deving Having Variable Stroke Length, filed Sep. 13, 2023.
U.S. Appl. No. 18/515,119, Massage Device Having a Predetermined Stroke Length, filed Nov. 20, 2023.
U.S. Appl. No. 18/515,126, Massage Device With a Releasable Connection for a Massaging Head, filed Nov. 20, 2023.
U.S. Appl. No. 18/760,576, Massage Device With a Releasable Connection for a Massaging Head filed Jul. 1, 2024.
U.S. Appl. No. 17/972,421 Published as: 2023/0042943, Percussive Massage Device With Selectable Stroke Length, filed Oct. 24, 2022.
U.S. Appl. No. 17/136,218 Published as: US2021/0361524, Battery-Powered Percussive Massage Device, filed Dec. 29, 2020.
U.S. Appl. No. 18/342,158, Percussive Massage Device With Self-Lubricating Cylinder, filed Jun. 27, 2023.
U.S. Appl. No. 18/452,274 Published as: US2024/0225953, Motor and Piston Assembly for Percussive Device, filed Aug. 18, 2023.

* cited by examiner

COMBINATION APPLICATOR AND ADAPTER FOR PERCUSSIVE MASSAGE DEVICE

FIELD OF THE DISCLOSED EMBODIMENTS

The subject matter of the present application is in the field of percussive massage devices, and, more particularly, is in the field of applicators for percussive massage devices.

BACKGROUND OF THE DISCLOSED EMBODIMENTS

Battery-powered percussive massage devices are becoming more popular due in part to decreasing weight and increasing battery life. Examples of percussive massage devices are illustrated in U.S. Pat. Nos. 10,314,762, 10,492,984, and 10,993,874, each of which is incorporated herein by reference in its entirety. As illustrated in the three patents, various types of percussive massage heads may be removably attached to a percussive massage device to provide differing massage experiences. An applicator may include two fixed applicator heads as illustrated, for example, in U.S. Design Pat. No. D907,792. As illustrated, for example, in U.S. Pat. No. 10,617,588, an adapter may be used to allow two removable applicator heads to be attached to a percussive massage device. The adapter cannot be used to apply percussive massage without attaching an applicator head to each of the two interfaces.

SUMMARY

A need exists for a percussive massage applicator that has at least two fixed applicator heads that can be used to apply percussive massage and that is further configured as an adapter to receive removable applicator heads that can be used to apply percussive massage to provide differing massage experiences.

One aspect of the embodiments disclosed herein is a combination applicator head and adapter ("applicator/adapter") that is removably attachable to a percussive massage device. The applicator head has a plurality of fixed applicator heads that can be applied directly against the body of a subject being massaged to provide a first massage effect. A corresponding plurality of removable applicator heads can be positioned over and attached to the fixed applicator heads. The removable applicator heads are applied against the body of the subject being massaged to provide a second massage experience Another aspect in accordance with embodiments disclosed herein is an applicator for a percussive massage device having at least two modes of operation. The applicator comprises a main body configured to attach to a percussive massage device. At least first and second support arms extend from the percussive massage device. Each support arm has an end portion distal from the main body. A respective fixed applicator head extends from the respective end portion of each support arm. Each fixed applicator head is configured to contact a portion of a body to provide a first massage effect. A respective removable applicator head is positioned over a respective one of the fixed applicator heads. Each removable applicator head is configured to contact a portion of a body to provide a second massage effect.

In certain embodiments in accordance with this aspect, each fixed applicator head comprises a circumferential groove, and each removable applicator head comprises an annular ledge surrounding an opening. The annular ledge engages the circumferential groove to secure the removable applicator head in position over the fixed applicator head. In certain embodiments, each fixed applicator head comprises a transverse groove that extends across a portion of the circumferential groove. The transverse groove provides an air passage proximate to the annular ledge of the removable applicator head.

In certain embodiments in accordance with this aspect, the at least first and second applicator arms comprises at least first, second and third applicator arms rotationally spaced apart by 120 degrees. A first fixed applicator head extends from the first applicator arm, a second fixed applicator head extends from the second applicator arm, and a third fixed applicator head extends from the third applicator arm. A first removable applicator head is positioned over the first fixed applicator head, a second removable applicator head is positioned over the second fixed applicator head, and a third removable applicator head is positioned over the third fixed applicator head.

In certain embodiments in accordance with this aspect, each removable applicator head comprises a truncated sphere.

In certain embodiments in accordance with this aspect, each removable applicator head comprises a compressible cylindrical body.

Another aspect in accordance with embodiments disclosed herein is a method of massaging. The method comprises attaching an applicator to a percussive massage device. The applicator has at least a first applicator arm and a second applicator arm. The first applicator arm has a respective fixed applicator head extending therefrom. The method further comprises positioning the first applicator heads against a first body portion; and activating the percussive massage device to massage the body portion with the fixed applicator heads. The method further comprises deactivating the percussive massage device; positioning a respective removable applicator head over each fixed applicator head; positioning the removable applicator heads against a second body portion; and activating the percussive massage device to massage the second body portion with the removable applicator heads.

In certain embodiments in accordance with this aspect, each fixed applicator head comprises a circumferential groove. Each removable applicator head comprises an annular ledge surrounding an opening. The annular ledge engages the circumferential groove to secure the removable applicator head in position over the fixed applicator head. In certain embodiments, each fixed applicator head comprises a transverse groove that extends across a portion of the circumferential groove. The transverse groove provides an air passage proximate to the annular ledge of the removable applicator head.

In certain embodiments in accordance with this aspect, the at least first and second applicator arms comprises at least first, second and third applicator arms rotationally spaced apart by 120 degrees. A first fixed applicator head extends from the first applicator arm, a second fixed applicator head extends from the second applicator arm, and a third fixed applicator head extends from the third applicator arm. A first removable applicator head is positioned over the first fixed applicator head, a second removable applicator head is positioned over the second fixed applicator head, and a third removable applicator head is positioned over the third fixed applicator head.

In certain embodiments in accordance with this aspect, each removable applicator head comprises a truncated sphere.

In certain embodiments in accordance with this aspect, each removable applicator head comprises a compressible cylindrical body.

BRIEF DESCRIPTIONS OF THE DRAWINGS

The foregoing aspects and other aspects of the disclosure are described in detail below in connection with the accompanying drawings in which.

DESCRIPTION OF ILLUSTRATED EMBODIMENTS

Figure 1:
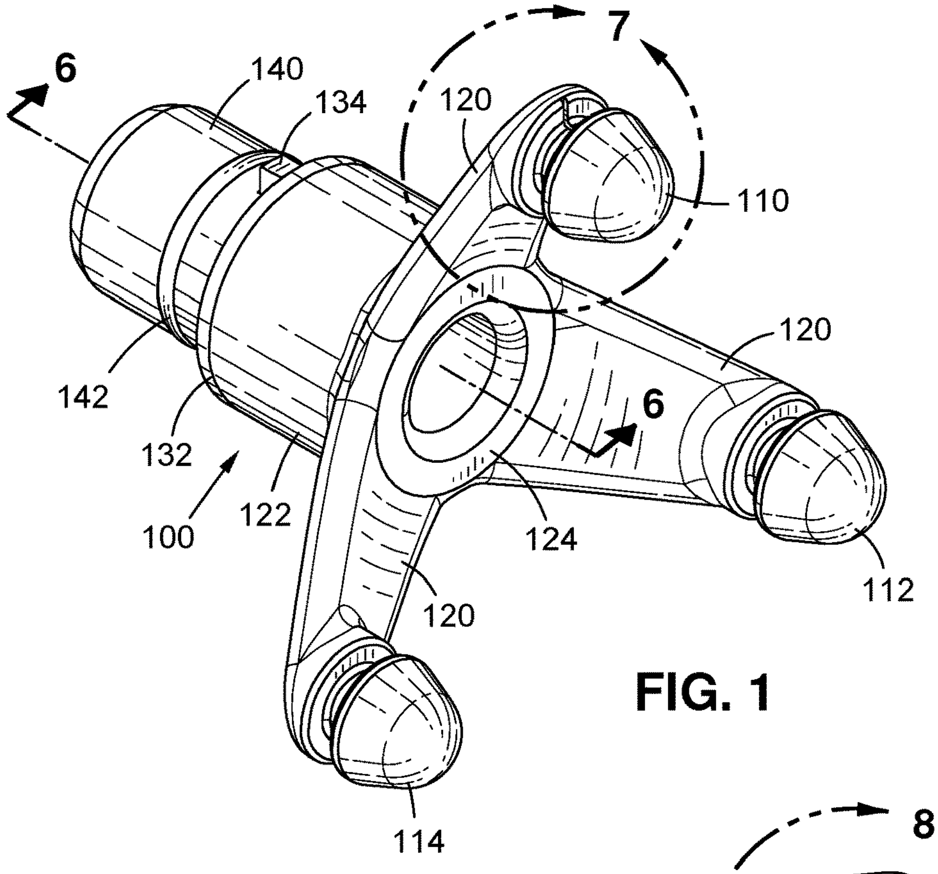
FIG. 1 illustrates a distal upper perspective view of an embodiment of an applicator/adapter, the applicator/adapter having three applicator heads that also serve as adapter interfaces.

As used throughout this specification, the words "upper," "lower," "longitudinal," "upward," "downward," "proximal," "distal," and other similar directional words are used with respect to the views being described.

FIGS. 1-6 illustrate an applicator/adapter 100. The applicator/adapter has at least two fixed applicator heads that also serve as adapter interfaces. In the illustrated embodiment, the applicator/adapter has three fixed applicator heads. A first fixed applicator head 110, a second fixed applicator head 112, and a third fixed applicator head 114 are spaced rotationally symmetrically about a central axis 116 (FIG. 2) of the applicator/adapter. In the illustrated embodiment having three fixed applicator heads, the three heads are rotationally spaced apart by approximately 120 degrees. The respective center of each head is positioned approximately 31.25 millimeters from the central axis of the applicator/adapter. In an alternative embodiment (not shown), two fixed applicator heads are rotationally spaced apart about the central axis by approximately 180 degrees. In further alternative embodiments, additional applicator heads can be included (e.g., four applicator heads rotationally spaced apart by 90 degrees. The three applicator heads disclosed herein provide a desirable evenly spaced massage effect as described below.

Figure 2:
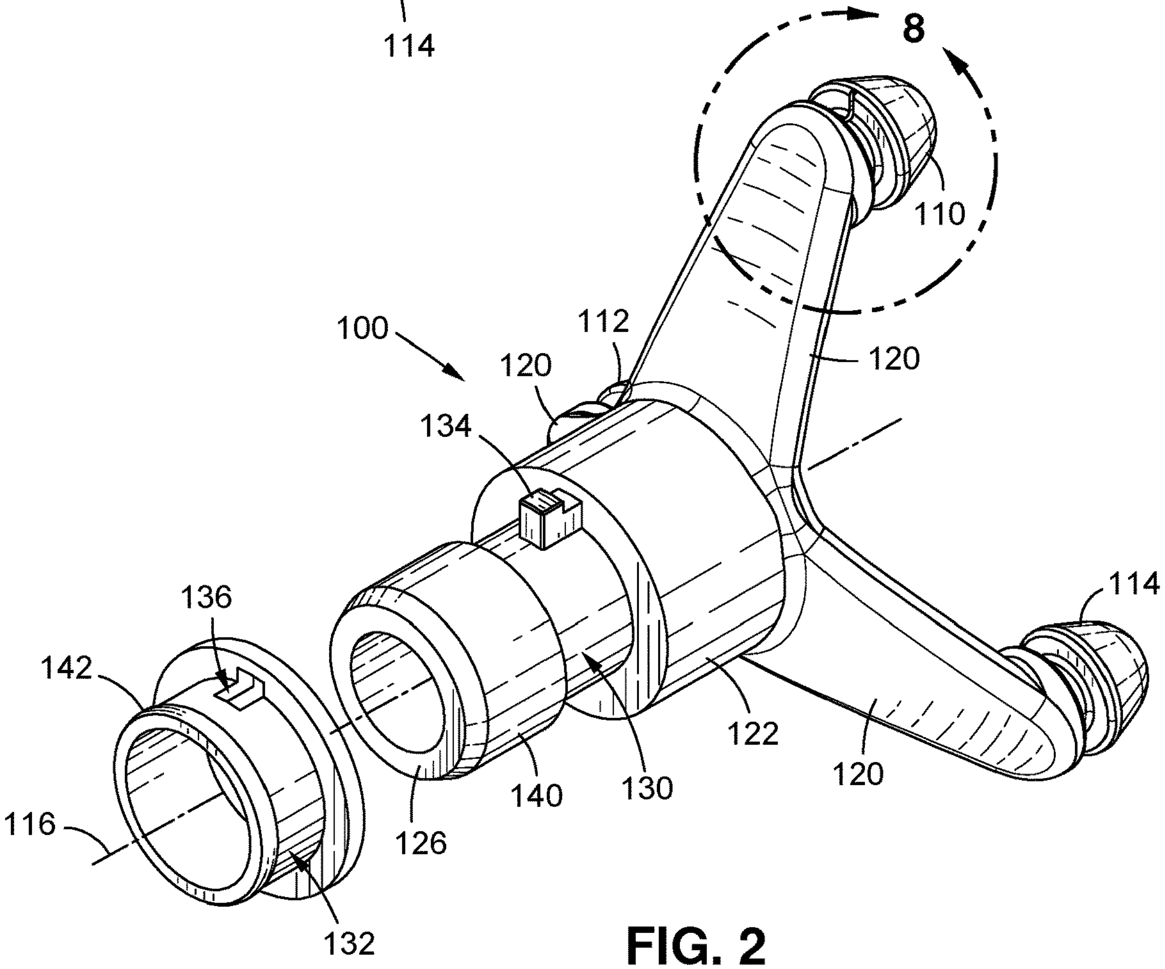
FIG. 2 illustrates a proximal upper perspective view of the applicator/adapter of FIG. 1, the view further showing a bushing prior to positioning of the bushing onto the shaft of the applicator/adapter.
Figure 3:
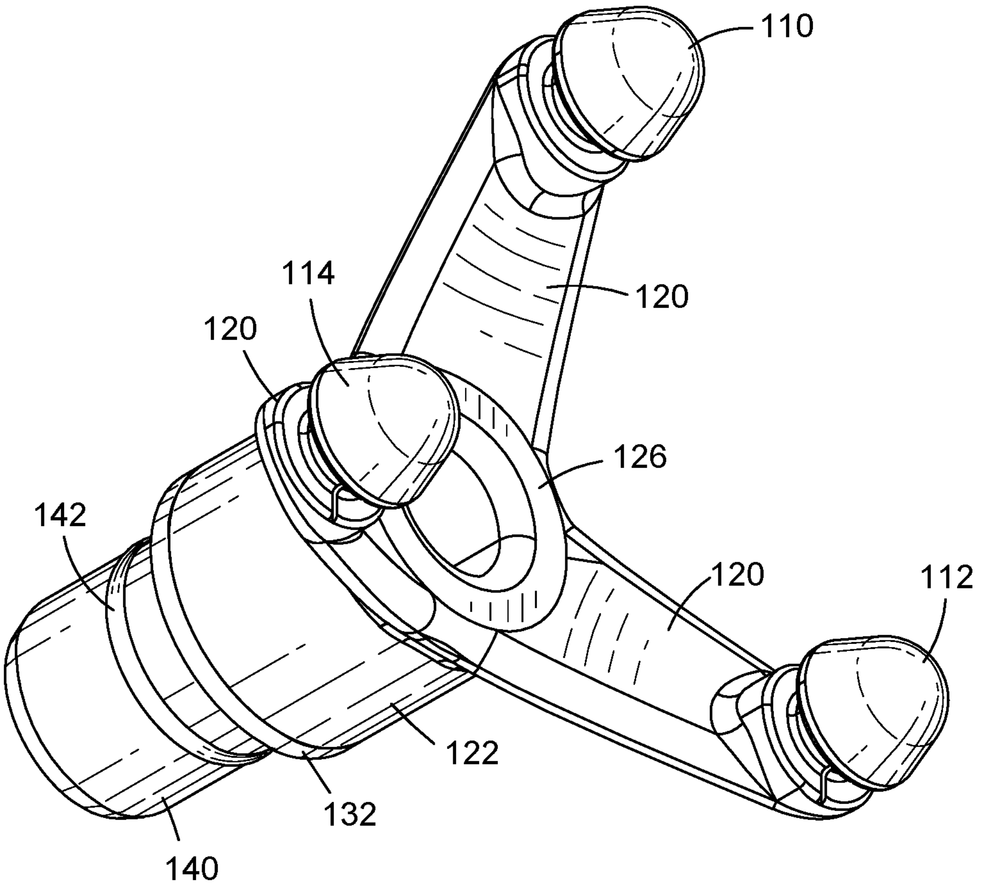
FIG. 3 illustrates a distal lower perspective view of the applicator/adapter of FIG. 1.
Figure 4:
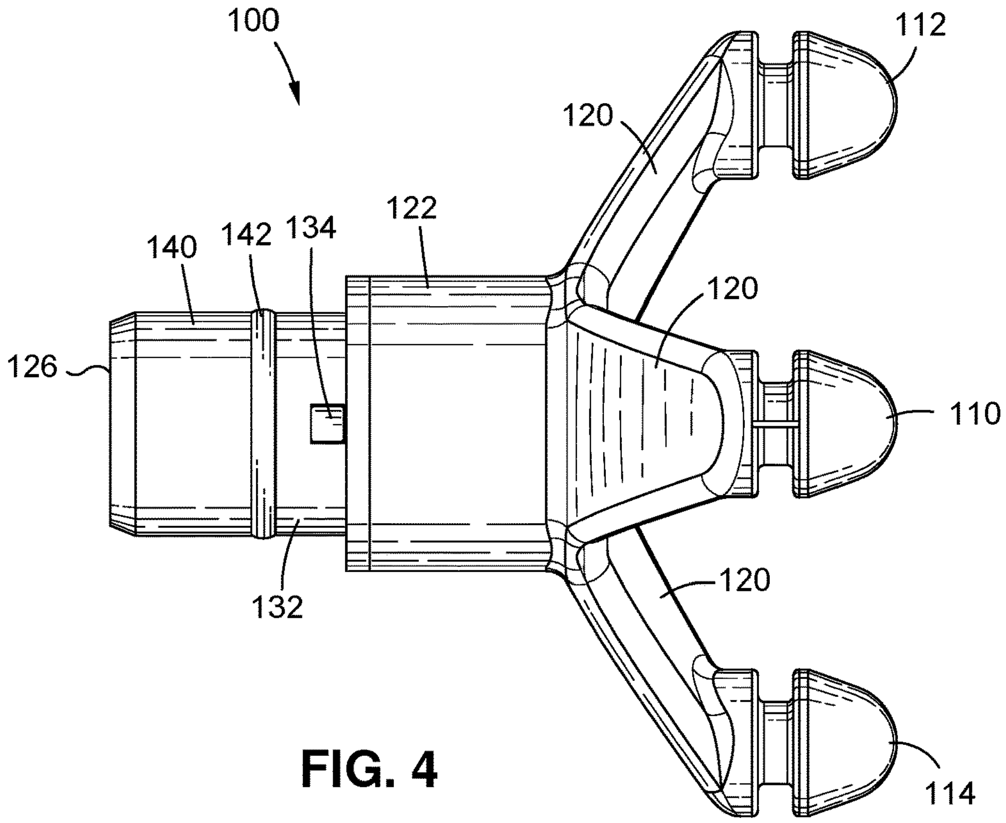
FIG. 4 illustrates a top plan view of the applicator/adapter of FIG. 1.
Figure 5:
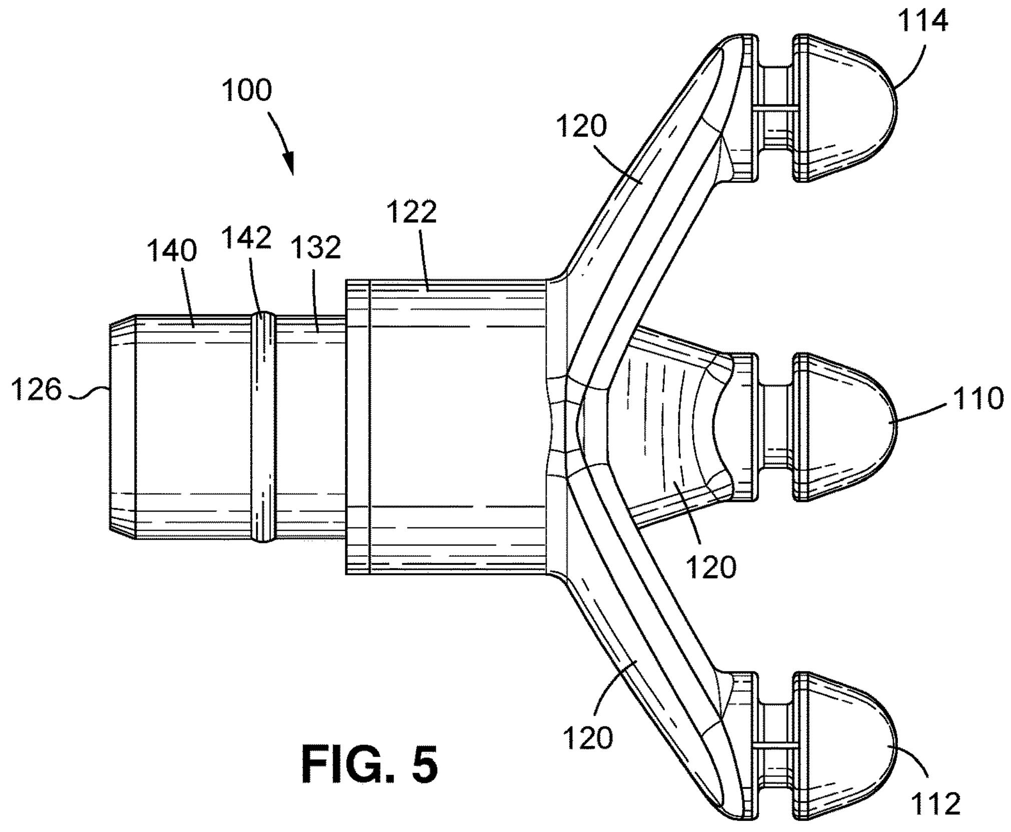
FIG. 5 illustrates a bottom plan view of the applicator/adapter of FIG. 1.

Each fixed applicator head 110, 112, 114 extends from a respective support arm 120. Each support arm extends at a selected angle from a distal end 124 of a cylindrical body 122. The cylindrical body is centered about the central axis 116. The cylindrical body has a proximal end 126 (FIG. 2).

The cylindrical body 122 includes a circumferential groove 130 (FIG. 2) between the distal end 124 and the proximal end 126. The circumferential groove receives a cylindrical elastomeric bushing 132. The bushing is held in place by a protrusion 134 extending radially from the circumferential groove into a notch 136 in the bushing (see FIG. 6).

A proximal end portion (or shaft) 140 of the cylindrical body 122 has a diameter sized to fit within the driving piston of a percussive massage device (see FIG. 15) such as the percussive massage device illustrated in U.S. Pat. No. 10,993,874, which is incorporated by reference herein. An annular distal portion 142 of the elastomeric bushing 132 has an enlarged diameter to frictionally engage the driving piston of the percussive massaged device to inhibit inadvertent release of the applicator/adapter from the driving piston.

Figure 7:
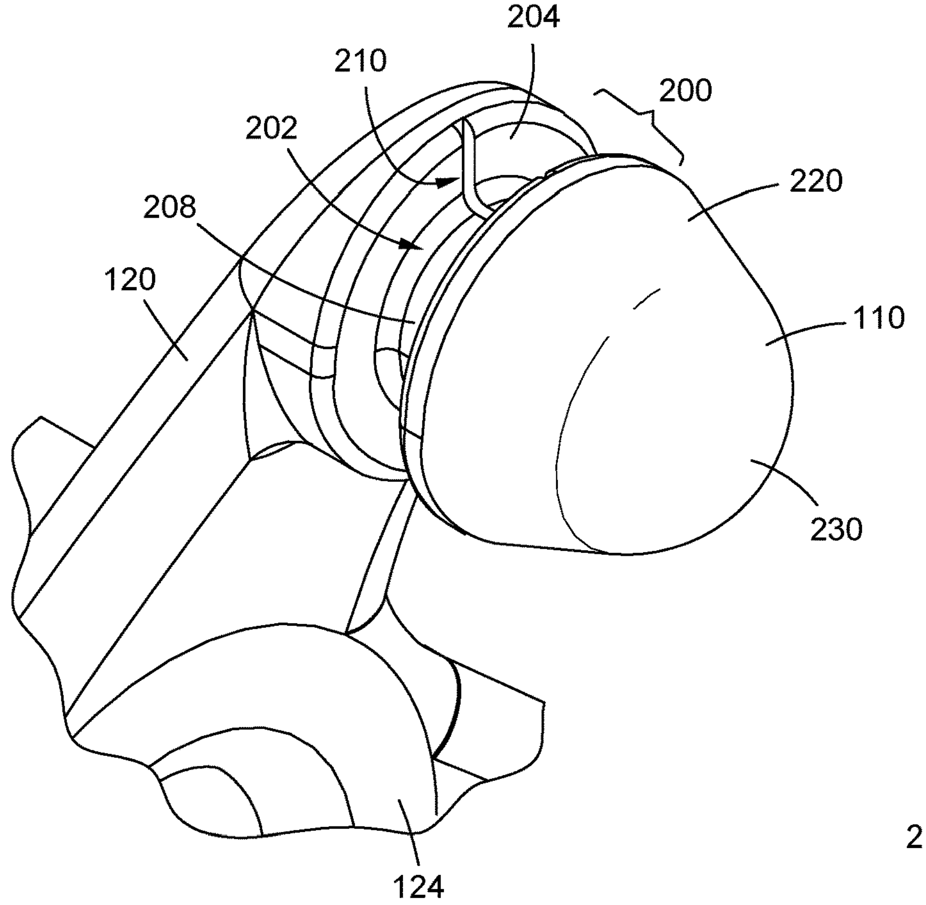
FIG. 7 illustrates an enlarged distal perspective view of the first fixed applicator head of FIGS. 1-6, the view in FIG. 7 corresponding to the portion of FIG. 1 taken within the area—7—in FIG. 1.
Figure 8:
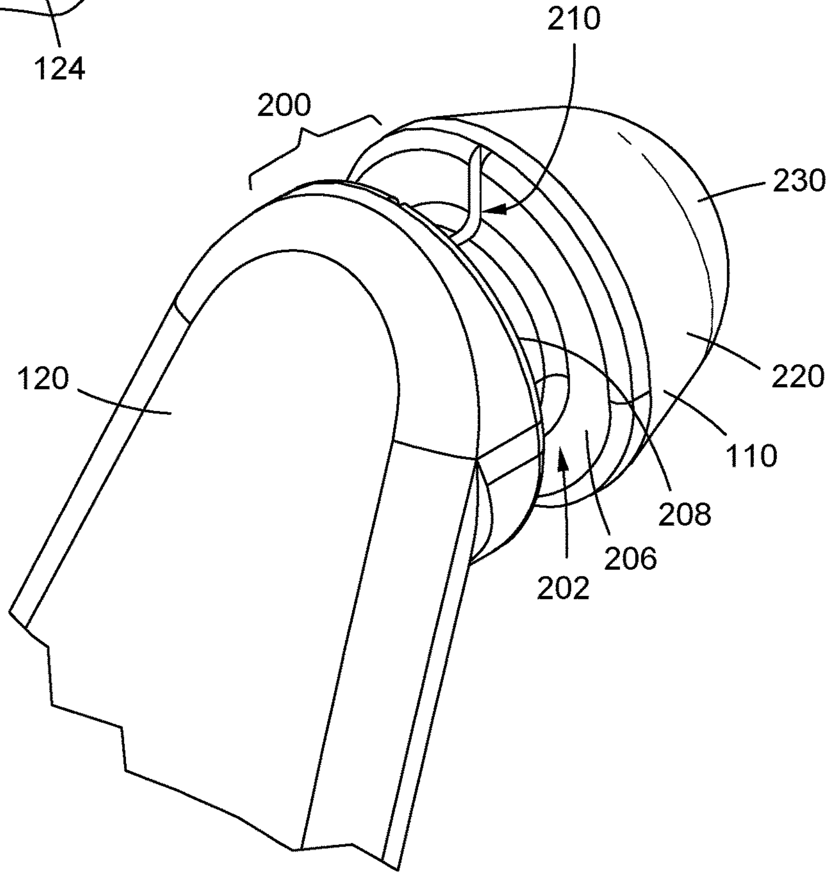
FIG. 8 illustrates an enlarged proximal perspective view of the first fixed applicator head of FIGS. 1-6, the view in FIG. 8 corresponding to the portion of FIG. 2 taken within the area—8—in FIG. 2.

The first fixed applicator head 110 is shown in more detail in the enlarged views of FIGS. 7 and 8. The second fixed applicator head 112 and the third fixed applicator head 114 are substantially identical to the first fixed applicator head. The first fixed applicator head comprises a cylindrical first portion 200 that extends from the respective support arm 120. The cylindrical first portion has a diameter of approximately 12.5 millimeters and a length of approximately 6.5 millimeters. A circumferential groove 202 is formed around a midportion of the cylindrical first portion. In the illustrated embodiment, the groove has a width (along the cylinder) between a first side surface 204 (FIG. 7) and a second side surface 206 (FIG. 8) of approximately 3 millimeters and has a radial depth (into the cylinder) to a circumferential inner surface 208 of approximately 2.75 millimeters.

Figure 6:
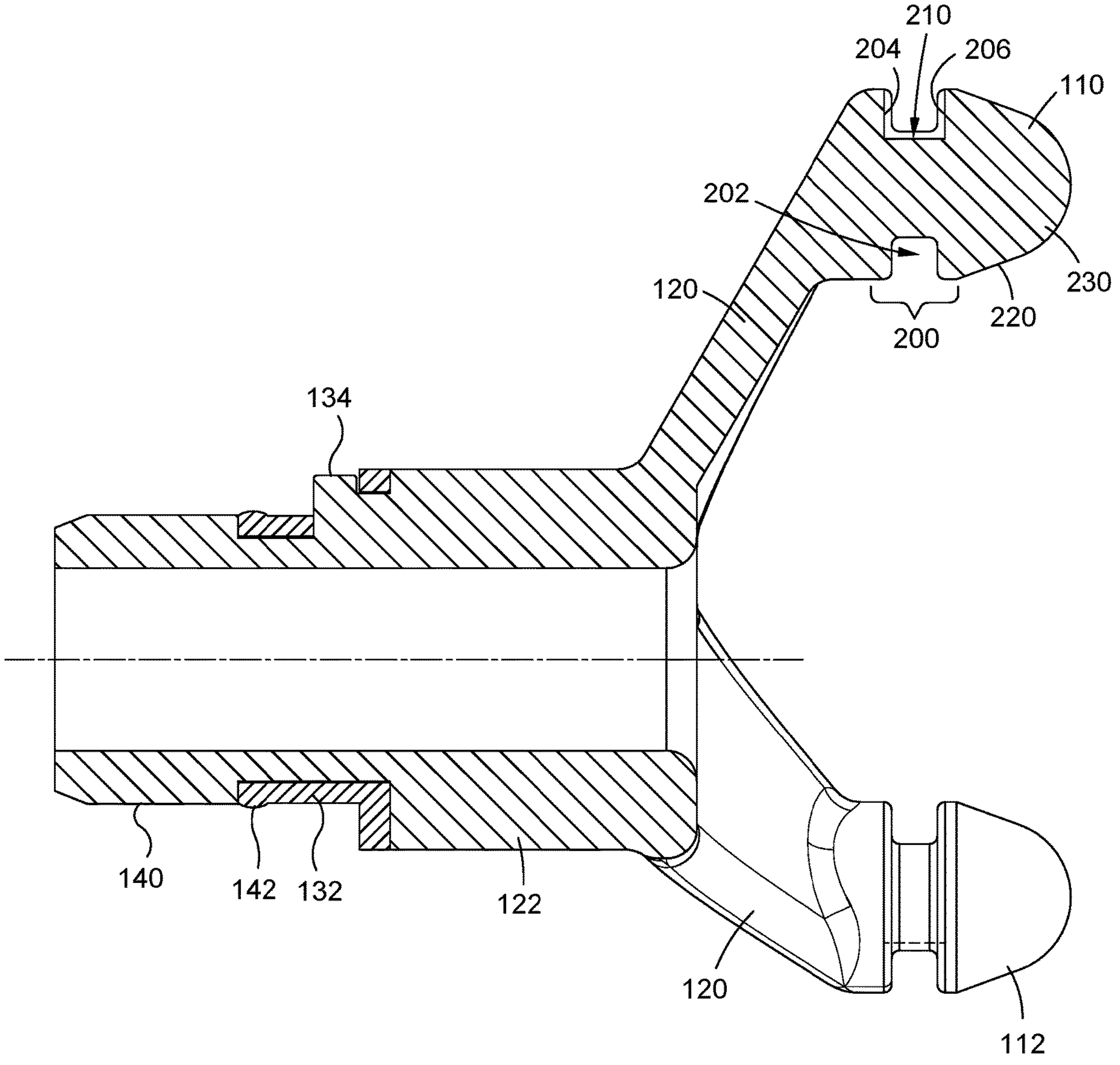
FIG. 6 illustrates a cross-sectional elevational view of the applicator/adapter of FIG. 1 taken along the line 6-6 in FIG. 1.

As further illustrated in FIGS. 7 and 8, the first applicator head 110 further includes a transverse groove 210 that extends across the circumferential groove 202. The transverse groove has a length along the cylinder of approximately 4 millimeters. The transverse groove is centered with respect to the circumferential groove such that the transverse groove extends approximately 0.5 millimeter beyond each of the first side surface 204 and the second side surface 206 of the circumferential groove. The transverse groove has a width of approximately 0.5 millimeter. The transverse groove extends to a depth of approximately 3.25 millimeters. Thus, a middle portion of the transverse groove extends approximately 0.5 millimeter into the circumferential inner surface 208 of the circumferential groove as shown in FIG. 6. The purposes of the circumferential groove and the transverse groove are described below.

As further shown in FIGS. 7 and 8, the first fixed applicator head 110 includes a conical second portion 220 that extends from the cylindrical first portion 200 for approximately 4.2 millimeters with a draft of approximately 20 degrees. A third portion 230 extends from the conical second portion. The third portion is formed as a spherical section (or spherical cap) comprising less than a hemisphere. In the illustrated embodiment, the third portion has a spherical radius of approximately 5 millimeters and extends approximately 3.3 millimeters from the second portion. As illustrated, the surface of the third portion is tangential to the outer surfaces of the second portion. Overall, the first fixed applicator head has an appearance similar to a gumdrop. Each of the fixed applicator heads comprises a suitable material having a combination of strength and flexible. For example, a polyamide or nylon material such as Nylon 66 is suitable is a suitable material. Glass may be added to the material to increase the strength of the material. Nylon 66 is commercially available and is easily moldable into the illustrated shape.

Figure 15:
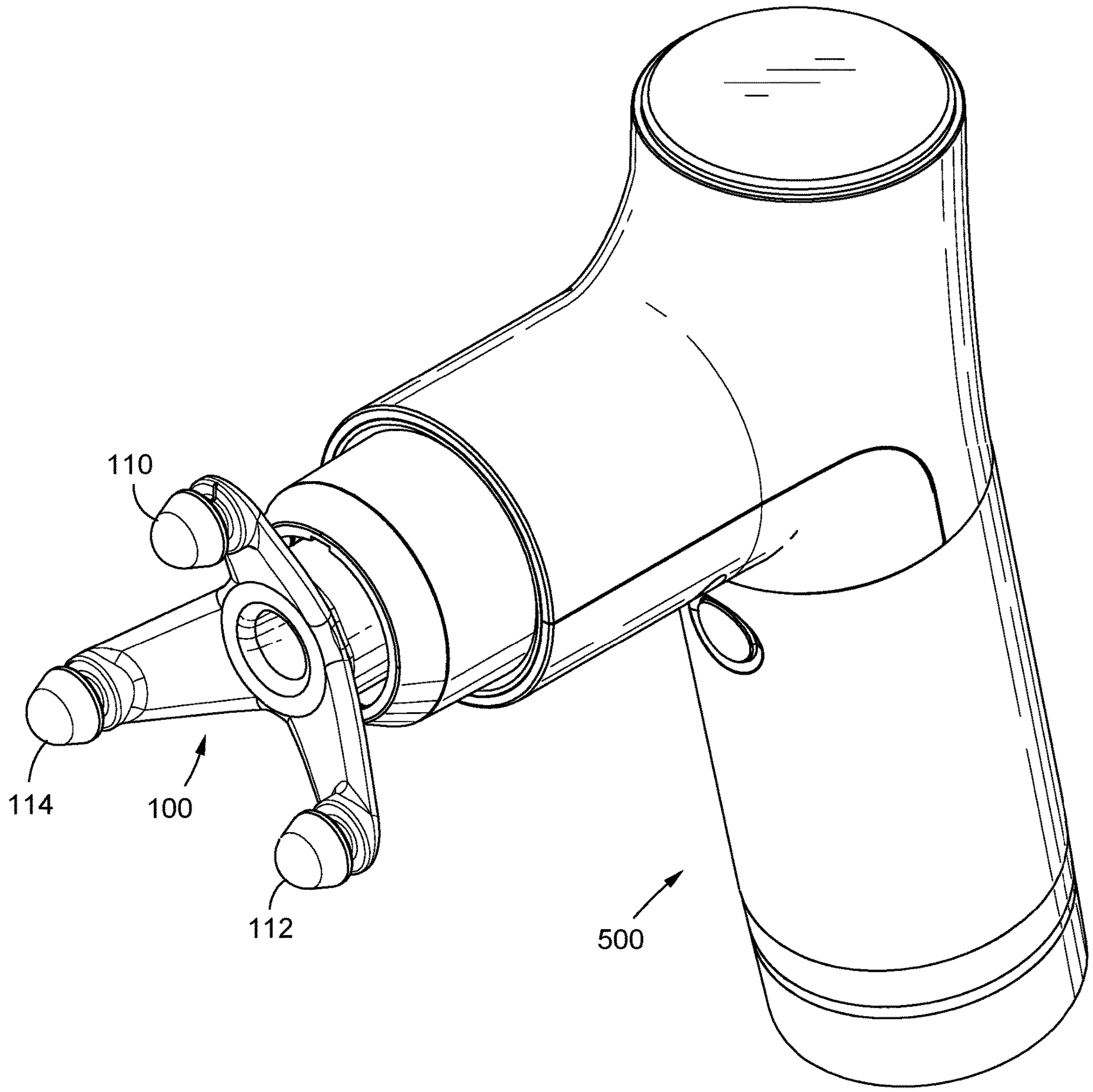
FIG. 15 illustrates the applicator/adapter of FIGS. 1-6 installed on a percussive massage device.

When attached to a percussive massage device such as the percussive massage device described in the above-identified patents and such as illustrated in FIG. 15, the applicator/adapter 100 applies a massage effect to a subject by touching each of the first applicator head 110, the second applicator head 112 and the third applicator head 114 to a portion of the body of the subject. When the percussive massage device is activated, the respective third portions 230 of the three fixed applicator heads are reciprocated against the body portion to provide a first percussive massage effect caused by the small surface area of the semirigid applicator heads. The three applicator heads are configured in a tripod-like arrangement, which allows a user to easily maintain the reciprocation axis 116 in a substantially perpendicular relationship to the skin of the subject to evenly distribute the percussive effect among the three heads.

Figure 9:
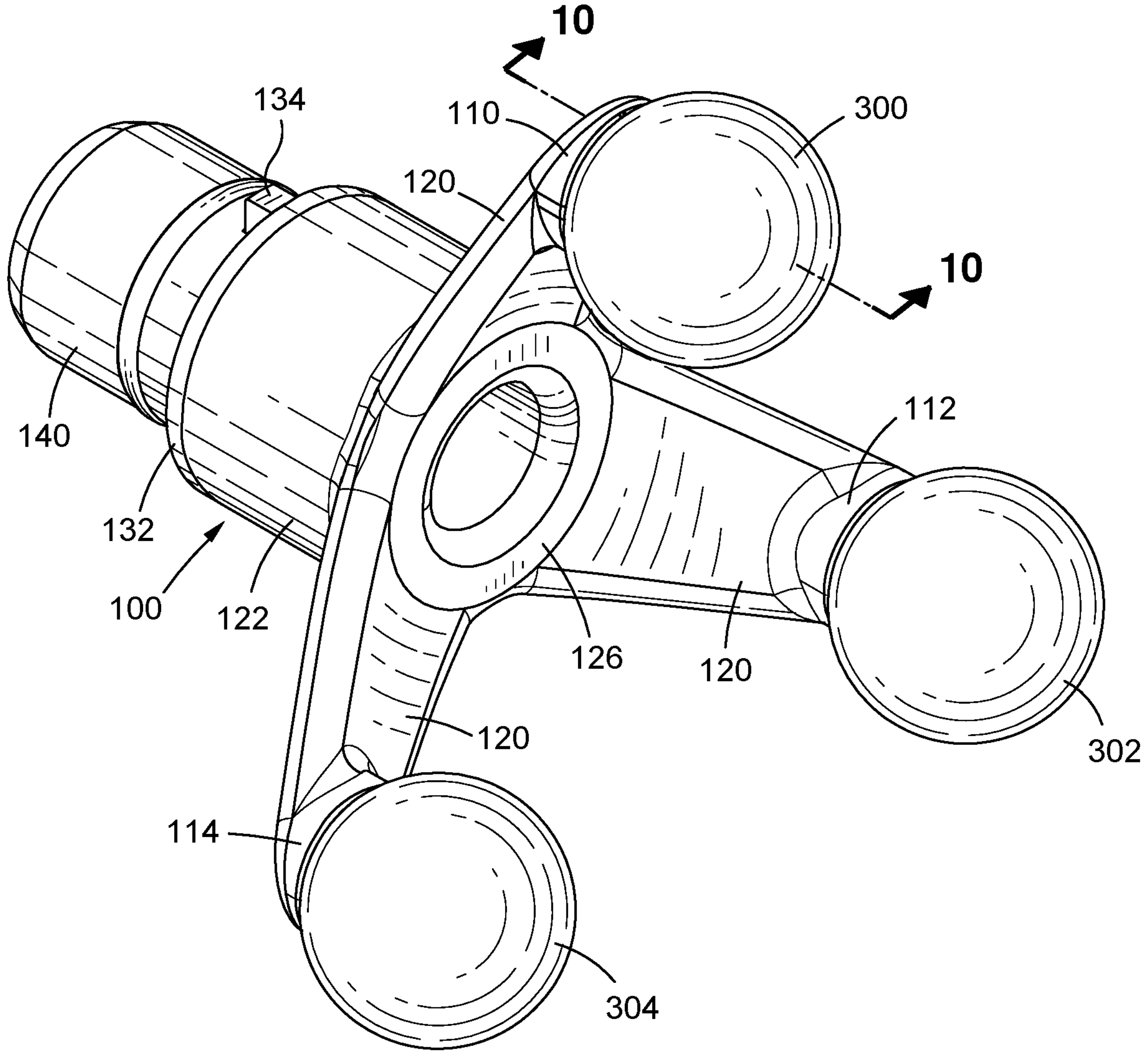
FIG. 9 illustrates a distal upper perspective view of the applicator/adapter of FIG. 1 with a respective removable ball applicator head positioned over each fixed applicator head.

When a different massage effect is desired, the applicator/adapter 100 functions as an adapter to receive a plurality of removably attachable applicator heads. For example, FIG. 9 illustrates the applicator/adapter with a first ball applicator head 300 positioned over the first fixed applicator head 110, with a second ball applicator head 302 positioned over the second fixed applicator head 112, and with a third ball applicator head 304 positioned over the third fixed applicator head 114.

Figure 10:
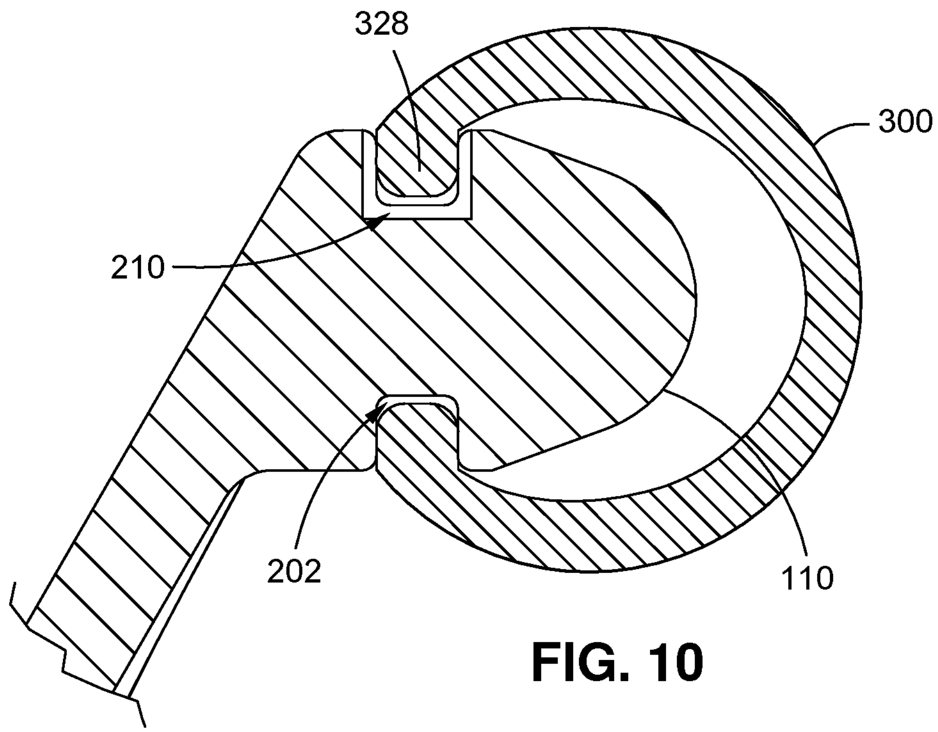
FIG. 10 illustrates a cross-sectional elevational view of the removable ball applicator head and the fixed applicator head of FIG. 9 taken along the line 10-10 in FIG. 9.

The positioning of the first ball applicator head 300 over the first fixed applicator head 110 is shown in more detail in the cross-sectional view of FIG. 10. The first ball applicator head is shown in the cross-sectional view of FIG. 11 prior to positioning the first ball applicator head on the first fixed applicator head. The respective positioning of each of the second ball applicator head 302 and the third ball applicator head 304 is the same and is not described herein. In an illustrated embodiment, the ball applicator heads comprise polyurethane rubber or another suitable elastomeric material. Such materials are commercially available.

Figure 11:
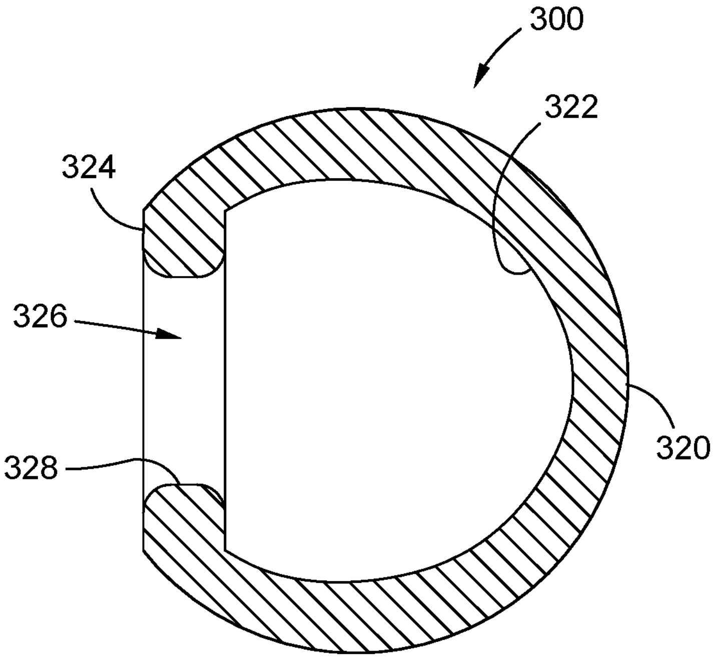
FIG. 11 illustrates a cross-sectional elevational view of the removable ball applicator head of FIG. 10 removed from the fixed applicator head.

As shown in FIGS. 10 and 11, the first ball applicator head 300 has a truncated spherical shape that is hollow. In one embodiment, a spherical outer surface 320 of the first ball applicator head has a diameter of approximately 20 millimeters. An inner surface 322 of the ball applicator head has an oblate spheroid shape having a greater diameter (horizontal direction in FIGS. 10 and 11) of approximately 16 millimeters and having a smaller diameter (vertical direction in FIGS. 10 and 11) of approximately 15 millimeters. Accordingly, the first ball applicator head has a wall thickness that varies from approximately 2 millimeters to approximately 2.5 millimeters.

The overall spherical shape of the first ball applicator head is truncated by approximately 2.2 millimeters to form a flattened end portion 324. An opening 326 is formed in the flattened end portion to form an annular ledge 328 around the opening. The opening has a diameter of approximately 7.7 millimeters. The annular ledge has a wall thickness of approximately 3 millimeters and extends inwardly from the inner surface 322 approximately 2.4 millimeters. The diameter of the opening is smaller than the outer diameter of the cylindrical first portion 200 of the fixed applicator head; however, the elastomeric material of the ball applicator head allows the opening to stretch such that the ball applicator head can be pushed onto the fixed applicator head until the annular ledge engages the circumferential groove 202 of the fixed applicator head. The thickness of the annular ledge of the ball applicator head is selected such that the annular ledge fits snugly within the 3-millimeter-wide circumferential groove to retain the ball applicator head on the fixed applicator head until deliberately removed by the user.

As shown in FIG. 10, the transverse groove 210 provides an air passage around the annular ledge 328 of the first ball applicator head 300. The air passage allows air within the first ball applicator head to be released from the interior of the first ball applicator head as the first ball applicator head is pushed onto the fixed applicator head 110. The air passage also allows air to be released from the interior of the first ball applicator head when the first ball applicator head is compressed when pressure is applied against a body portion during a first half cycle of a reciprocation of the percussive massage device. The air passage also allows air to return to the interior of the first ball applicator head when the first ball applicator head returns to its original volume when pressure is releases during a second half cycle of the reciprocation of the percussive massage device.

Figure 12:
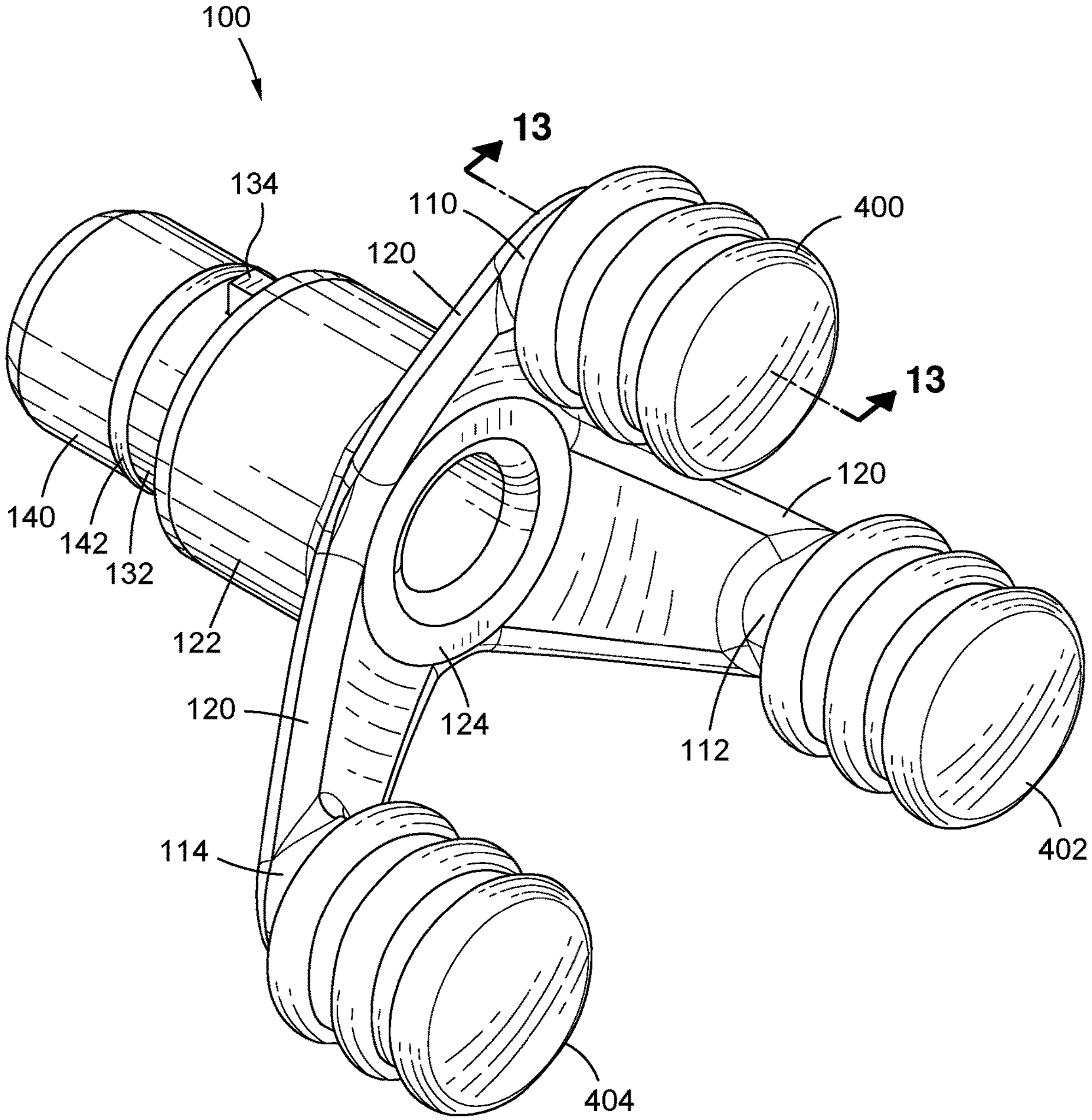
FIG. 12 illustrates a distal upper perspective view of the applicator/adaptor of FIG. 1 with a respective removable cushion applicator head positioned over each fixed applicator head.

FIG. 12 illustrates the applicator/adapter with a first cushion applicator head 400 positioned over the first fixed applicator head 110, with a second cushion applicator head 402 positioned over the second fixed applicator head 112, and with a third cushion applicator head 404 positioned over the third fixed applicator head 114. As described below, each removable cushion applicator head may also be referred to as a removable compressible cylindrical applicator head.

Figure 13:
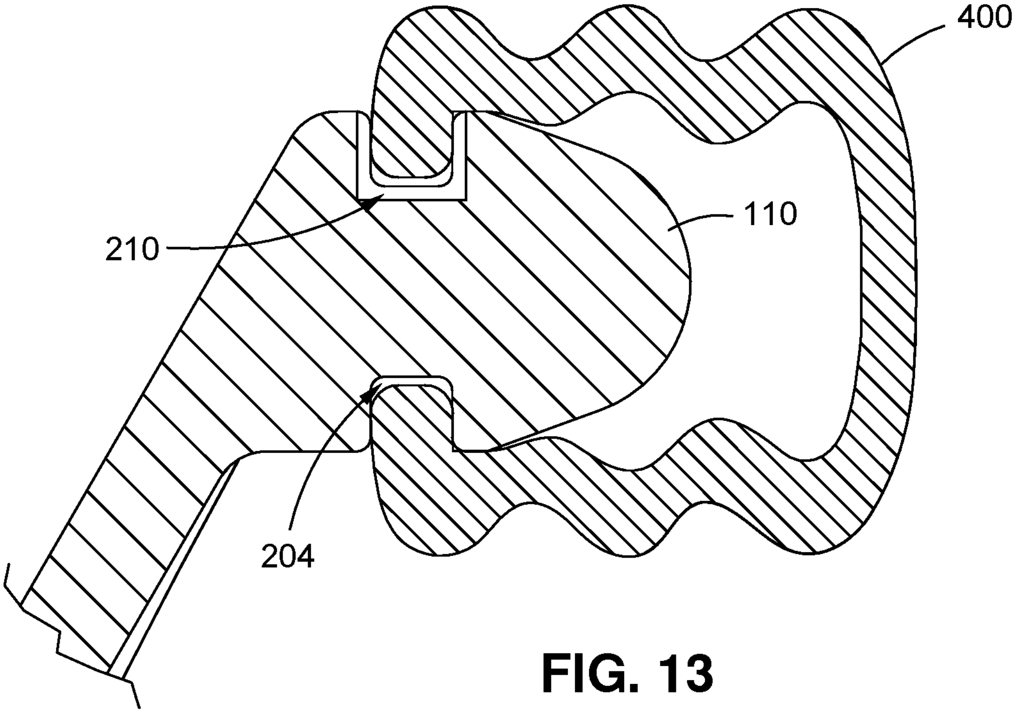
FIG. 13 illustrates a cross-sectional elevational view of the removable cushion applicator head and the fixed applicator head of FIG. 12 taken along the line 13-13 in FIG. 12.

The positioning of the first cushion applicator head 400 over the first fixed applicator head 110 is shown in more detail in the cross-sectional view of FIG. 13. The first cushion applicator head is shown in the cross-sectional view of FIG. 14 prior to positioning the first cushion applicator head on the first fixed applicator head. The respective positioning of each of the second cushion applicator head 402 and the third cushion applicator head 404 is the same and is not described herein. The cushion applicator heads may comprise the same material as the ball applicator heads described above.

Figure 14:
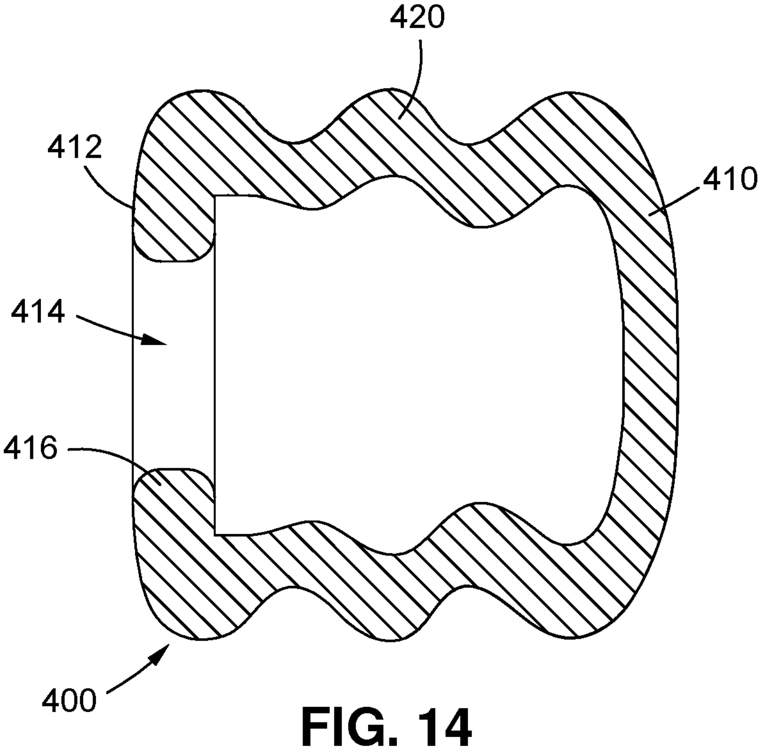
FIG. 14 illustrates a cross-sectional view of the removable cushion applicator head of FIG. 13 removed from the fixed applicator head.

As shown in FIGS. 13 and 14, the first cushion applicator head 400 comprises a compressible cylindrical body. The body has a generally cylindrical shape with a slightly arcuate closed distal end 410 and an open proximal end 412. The proximal end has an opening 414 surrounded by an annular ledge 416. A wall 420 of the first cushion applicator head between the distal end has a rippled shape to form a shape similar to a cylindrical bellows. This bellows-like shape allows the first cushion applicator head to compress when pressure is applied and to return to the original illustrated shape when pressure is removed.

In one embodiment, the first cushion applicator head 400 has cylindrical length of approximately 20 millimeters. The first cushion applicator head has a maximum outer diameter of approximately 20 millimeters and minimum outer diameter of approximately 16 millimeters. The first cushion applicator head has a maximum inner diameter of approximately 14 millimeters and a minimum inner diameter of approximately 10 millimeters. The wall thickness varies because of the rippled shape of the head. For example, the wall thickness varies from approximately 2 millimeters to approximately 3.5 millimeters.

The opening 414 in the proximal end 412 of the first cushion applicator head 400 has a diameter of approximately 7.7 millimeters. The annular ledge 416 has a wall thickness of approximately 3 millimeters and extends inward for approximately 2.4 millimeters. The diameter of the opening is smaller than the outer diameter of the cylindrical first portion 200 of the fixed applicator head; however, the elastomeric material of the cushion applicator head allows the opening to stretch such that the cushion applicator head can be pushed onto the fixed applicator head until the annular ledge engages the circumferential groove 202 of the fixed applicator head. The thickness of the annular ledge of the cushion applicator head is selected such that the annular ledge fits snugly within the 3-millimeter-wide circumferential groove to retain the cushion applicator head on the fixed applicator head until deliberately removed by the user.

As further shown in FIG. 12, the transverse groove 210 in the first fixed applicator head 110 provides an air passage around the annular ledge 416 of the first cushion applicator head 400. The air passage allows air within the first cushion applicator head to be released from the interior of the first cushion applicator head as the first cushion applicator head is pushed onto the fixed applicator head 110. The air passage also allows air to be released from the interior of the first cushion applicator head when the first cushion applicator head is compressed when pressure is applied against a body portion during a first half cycle of a reciprocation of the percussive massage device. The air passage also allows air to return to the interior of the first cushion applicator head when the first cushion applicator head returns to its original volume when pressure is released during a second half cycle of the reciprocation of the percussive massage device.

The applicator/adaptor 100 is shown attached to a percussive massage device 500 in FIG. 15. For example, the percussive massage device may be constructed in accordance with U.S. Pat. No. 10,993,874, which is incorporated by reference herein. The applicator/adapter is retained in place by the frictional engagement of the elastomeric bushing 132 within the piston (not shown) of the percussive massage device. When the percussive massage device is activated, the applicator/adapter reciprocates along the axis 116. The ball applicator heads 300, 302, 304 or the cushion applicator heads 400, 402, 404 may be attached to the applicator/adapter while the applicator/adapter is attached to the percussive massage device or may be attached with the applicator/adapter removed from the percussive massage device. The three evenly spaced applicator heads provide a desirable massage experience by spacing the force applied over a larger surface area while allowing the user to maintain control of the location of the applicator heads on the body portion being massaged.

Additional versions of removable applicator heads may be used with the fixed applicator head to provide further different massage experiences. Each such removable applicator head has a proximal opening surrounded by a ledge to enable the removable applicator head to engage the circumferential groove 202 of the respective fixed applicator head 110, 112, 114 onto which the removable applicator head is positioned.

As various changes could be made in the above constructions without departing from the scope of the invention, it is intended that all the matter contained in the above description or shown in the accompanying drawings shall be interpreted as illustrative and not in a limiting sense.

What is claimed is:

1. An applicator for a percussive massage device having at least two modes of operation, the applicator comprising:
- a main body configured to attach to a percussive massage device;
- a fixed applicator head configured to contact a portion of a body to provide a first massage effect; and
- a removable applicator head positioned over the fixed applicator head and configured to contact a portion of a body to provide a second massage effect,
- wherein the fixed applicator head comprises a circumferential groove extending around an entire circumference of the fixed applicator head, the circumferential groove comprising two opposing side surfaces and a transverse groove extending across the circumferential groove.

2. The applicator as defined in claim 1, wherein the removable applicator head comprises an annular ledge surrounding an opening, the annular ledge engaging the circumferential groove to secure the removable applicator head in position over the fixed applicator head.

3. The applicator as defined in claim 2, wherein the transverse groove provides an air passage proximate to the annular ledge of the removable applicator head.

4. The applicator as defined in claim 2, wherein a diameter of the opening of the removable applicator head is smaller than a maximum outer diameter of the fixed applicator head.

5. The applicator as defined in claim 2, wherein a thickness of the annular ledge achieves a snug fit between the annular ledge and the circumferential groove.

6. The applicator as defined in claim 1, further comprising at least first, second, and third applicator arms extending from the percussive massage device, each applicator arm having an end portion distal from the main body, wherein:
- the at least first, second, and third applicator arms are circumferentially spaced apart by 120 degrees;
- a first fixed applicator head extends from the first applicator arm, a second fixed applicator head extends from the second applicator arm, and a third fixed applicator head extends from the third applicator arm; and
- a first removable applicator head is positioned over the first fixed applicator head, a second removable applicator head is positioned over the second fixed applicator head, and a third removable applicator head is positioned over the third fixed applicator head.

7. The applicator as defined in claim 1, wherein the removable applicator head comprises a truncated sphere.

8. The applicator as defined in claim 1, wherein the removable applicator head comprises a compressible cylindrical body.

9. The applicator as defined in claim 1, wherein the transverse groove extends along sidewall surfaces of the circumferential groove.

10. A method of massaging comprising:
- attaching an applicator to a percussive massage device, the applicator having a fixed applicator head extending therefrom;

positioning the fixed applicator head against a first body portion;

activating the percussive massage device to massage the body portion with the fixed applicator head;

deactivating the percussive massage device;

positioning a removable applicator head over the fixed applicator head;

positioning the removable applicator head against a second body portion; and activating the percussive massage device to massage the second body portion with the removable applicator head, wherein the fixed applicator head comprises a circumferential groove extending around an entire circumference of the fixed applicator head, the circumferential groove comprising two opposing side surfaces and a transverse groove extending across the circumferential groove.

11. The method as defined in claim 10, wherein the removable applicator head comprises an annular ledge surrounding an opening, the annular ledge engaging the circumferential groove to secure the removable applicator head in position over the fixed applicator head.

12. The method as defined in claim 11, wherein the transverse groove provides an air passage proximate to the annular ledge of the removable applicator head.

13. The method as defined in claim 11, wherein a diameter of the opening of the removable applicator head is smaller than a maximum outer diameter of the fixed applicator head.

14. The method as defined in claim 11, wherein a thickness of the annular ledge achieves a snug fit between the annular ledge and the circumferential groove.

15. The method as defined in claim 10, wherein:

the applicator comprises at least first, second, and third applicator arms extending from the percussive massage device, each applicator arm having an end portion distal from a main body of the applicator;

the at least first, second, and third applicator arms are circumferentially spaced apart by 120 degrees;

a first fixed applicator head extends from the first applicator arm, a second fixed applicator head extends from the second applicator arm, and a third fixed applicator head extends from the third applicator arm; and a first removable applicator head is positioned over the first fixed applicator head, a second removable applicator head is positioned over the second fixed applicator head, and a third removable applicator head is positioned over the third fixed applicator head.

16. The method as defined in claim 10, wherein the removable applicator head comprises a truncated sphere.

17. The method as defined in claim 10, wherein the removable applicator head comprises a compressible cylindrical body.

18. The method as defined in claim 10, wherein the transverse groove extends along sidewall surfaces of the circumferential groove.

* * * * *